US005904727A

United States Patent [19]

Prabhakaran

[11] Patent Number: 5,904,727

[45] Date of Patent: May 18, 1999

[54] GRAPHICAL FLEET MANAGEMENT METHODS

[75] Inventor: Sanjiv Prabhakaran, San Jose, Calif.

[73] Assignee: Mobile Information Systems, Inc., Sunnyvale, Calif.

[21] Appl. No.: 08/706,341

[22] Filed: Aug. 30, 1996

Related U.S. Application Data

[63] Continuation-in-part of application No. 08/443,062, May 17, 1995, Pat. No. 5,636,122, and a continuation-in-part of application No. 08/443,063, May 17, 1995, Pat. No. 5,758, 313

[60] Provisional application No. 60/003,153, Sep. 1, 1995.

[51] Int. Cl.[6] .............................. G08G 1/13; G01S 7/10; G06F 17/60

[52] U.S. Cl. .......................... 701/208; 701/117; 340/990

[58] Field of Search .................................... 701/208, 300, 701/207, 117; 340/990, 992, 993; 345/348

[56] References Cited

U.S. PATENT DOCUMENTS

| | | | |
|---|---|---|---|
| 3,845,289 | 10/1974 | French | 235/151.2 |
| 4,360,876 | 11/1982 | Girault et al. | 364/449 |
| 4,513,377 | 4/1985 | Hasebe et al. | 364/449 |
| 4,570,227 | 2/1986 | Tachi et al. | 364/444 |
| 4,608,656 | 8/1986 | Tanaka et al. | 364/449 |
| 4,611,293 | 9/1986 | Hatch et al. | 364/571 |
| 4,613,913 | 9/1986 | Phillips | 360/51 |
| 4,630,209 | 12/1986 | Saito et al. | 364/444 |
| 4,660,037 | 4/1987 | Nakamura et al. | 340/990 |
| 4,672,565 | 6/1987 | Kuno et al. | 364/571 |
| 4,673,878 | 6/1987 | Tsushima et al. | 324/226 |
| 4,675,676 | 6/1987 | Takanabe et al. | 340/995 |
| 4,723,218 | 2/1988 | Hasebe et al. | 364/449 |
| 4,734,863 | 3/1988 | Honey et al. | 364/449 |
| 4,737,916 | 4/1988 | Ogawa et al. | 364/443 |
| 4,751,512 | 6/1988 | Longaker | 342/357 |
| 4,782,447 | 11/1988 | Ueno et al. | 364/449 |
| 4,788,645 | 11/1988 | Zavoli et al. | 364/449 |
| 4,796,191 | 1/1989 | Honey et al. | 364/450 |
| 4,797,841 | 1/1989 | Hatch | 364/571.04 |
| 4,831,563 | 5/1989 | Ando et al. | 364/571.05 |
| 4,862,398 | 8/1989 | Shimizu et al. | 364/571.05 |
| 4,873,513 | 10/1989 | Soults | 340/723 |
| 4,891,650 | 1/1990 | Sheffer | 342/457 |
| 4,914,605 | 4/1990 | Loughmiller, Jr. et al. | 364/424.01 |
| 4,918,609 | 4/1990 | Yamawaki | 364/449 |
| 4,924,402 | 5/1990 | Ando et al. | 364/449 |
| 4,926,336 | 5/1990 | Yamada | 364/444 |
| 4,937,753 | 6/1990 | Yamada | 364/449 |
| 4,954,959 | 9/1990 | Moroto et al. | 364/449 |
| 4,964,052 | 10/1990 | Ohe | 364/449 |
| 4,970,652 | 11/1990 | Nagashima | 364/449 |
| 4,982,332 | 1/1991 | Saito et al. | 364/449 |
| 4,984,168 | 1/1991 | Neukrichner et al. | 364/449 |
| 4,989,151 | 1/1991 | Nuimura | 364/449 |
| 4,992,947 | 1/1991 | Nuimura et al. | 364/444 |

(List continued on next page.)

OTHER PUBLICATIONS

Allen, David P., "Here Be Dragons...," *CD–ROM EndUser*, Mar. 1990.

French, R.L., "MAP Matching Origins Approaches and Applications," Robert L. French & Associates, 3815 Lisbon Street, Suite 201, Fort Worth, Texas 76107, pp. 91–116.

Sena, Michael L; "Computer–Aided Dispatching"; Computers Graphics World; Pennwell (Publ.); May 1990.

*Primary Examiner*—Michael Zanelli
*Attorney, Agent, or Firm*—Townsend and Townsend and Crew LLP

[57] ABSTRACT

A method for tracking a location of a transmitter with a computer system, the computer system coupled to a vector database includes the steps of determining the location of the transmitter, displaying a rasterized representation of a geographic area on a display, in response to the location of the transmitter, determining an icon associated with the transmitter, displaying the icon on the rasterized representation on the display, in response to the location of the transmitter, and outputting vector data in response to the location of the transmitter.

44 Claims, 17 Drawing Sheets

U.S. PATENT DOCUMENTS

| | | | |
|---|---|---|---|
| 4,996,645 | 2/1991 | Van der Zon | 364/449 |
| 4,999,783 | 3/1991 | Tenomoku et al. | 364/449 |
| 5,003,317 | 3/1991 | Gray et al. | 342/457 |
| 5,040,122 | 8/1991 | Neukirchner et al. | 364/449 |
| 5,046,011 | 9/1991 | Kahikara et al. | 364/449 |
| 5,060,162 | 10/1991 | Ueyama et al. | 364/449 |
| 5,067,081 | 11/1991 | Person | 364/444 |
| 5,109,399 | 4/1992 | Thompson | 379/45 |
| 5,122,959 | 6/1992 | Nathanson et al. | 364/436 |
| 5,140,532 | 8/1992 | Beckwith, Jr. et al. | 395/101 |
| 5,155,689 | 10/1992 | Wortham | 364/460 |
| 5,177,685 | 1/1993 | Davis et al. | 364/443 |
| 5,222,690 | 6/1993 | Jeffords | 244/1 R |
| 5,243,530 | 9/1993 | Stanifer et al. | 364/452 |
| 5,272,638 | 12/1993 | Martin et al. | 364/444 |
| 5,283,743 | 2/1994 | Odagawa | 364/457 |
| 5,287,297 | 2/1994 | Ihara et al. | 364/571.02 |
| 5,297,049 | 3/1994 | Gurmu et al. | 364/436 |
| 5,297,050 | 3/1994 | Ichimura et al. | 364/444 |
| 5,311,195 | 5/1994 | Mathis et al. | 342/357 |
| 5,334,974 | 8/1994 | Simms et al. | 340/390 |
| 5,428,546 | 6/1995 | Shah et al. | 364/449 |
| 5,434,788 | 7/1995 | Seymour et al. | 364/449 |
| 5,470,233 | 11/1995 | Fruchterman et al. | 434/112 |
| 5,485,161 | 1/1996 | Vaughn | 342/357 |
| 5,487,139 | 1/1996 | Saylor et al. | 395/135 |
| 5,604,676 | 2/1997 | Penzias | 705/417 |
| 5,677,837 | 10/1997 | Reynolds | 364/424.028 |

GRAPHICAL FLEET MANAGEMENT METHODS

CROSS REFERENCE TO RELATED APPLICATIONS

This application is a continuation-in-part of application Ser. No. 08/443,062 filed May 17, 1995 now U.S. Pat. No. 5,636,122 and is a continuation-in-part of Provisional application Ser. No. 60/003,153 filed Sep. 1, 1995, all in the name of the present assignee. This application is also a continuation-in-part of application Ser. No. 08/443,063 filed May 17, 1995 now U.S. Pat. No. 5,758,313 issued May 26, 1998, in the name of the present assignee. Furthermore, this application is related to application Ser. Nos. 08/706,211, filed Aug. 30, 1996, and 08/697,825, filed Aug. 30, 1996 filed on the same date of this present application, all in the name of the present assignee. All of these documents are hereby incorporated by reference for all purposes.

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to methods and apparatus for fleet management. More specifically, the present invention relates to methods for graphically tracking the location and status of mobile transmitter units.

In the fleet management business, knowledge of the status and location of a fleet of vehicles, carrying mobile transmitter units, is a powerful tool for a fleet manager and fleet drivers. By quickly being able to determine the location of the fleet, the fleet manager is able to make informed and efficient time critical decisions, and fleet drivers are able to efficiently determine their position.

Various navigational systems, including the LORAN system, the Global Positioning System (GPS), and others, have been used to determine the locations of vehicles in the fleet, typically in terms of longitude and latitude. By installing mobile navigational systems and mobile transmitter units into such vehicles, fleet drivers are able to determine their position within a geographic area and the fleet manager is able to receive updated positions of fleet vehicles.

Typical fleet management systems have required the fleet manager to "manage" information between multiple computers and display screens. For example, on a first computer, fleet management software provides the fleet manager with information regarding types of vehicles in the fleet, cargo, drivers, and jobs assigned to the vehicles, the job schedule etc. Next, on a second computer, mapping software provides the fleet manager with a graphic representation illustrating the geographic position of the fleet vehicles. Such a scenario is sufficient for the fleet manager if minor changes, modifications, etc. are needed for the fleet throughout the day, however this is not the typical case. In a more typical situation, the fleet manager has to contend with scheduling changes due to broken-down vehicles, traffic jams, rush jobs, cancellations, etc. Because of these changes, the fleet manager must constantly refer back-and-forth between screens in order to dynamically manage the fleet, for example re-assigning jobs, re-routing vehicles, adding jobs, etc.

FIG. 1 illustrates one of the first fleet management systems that provided enhanced graphical displays to the fleet manager. FIG. 1 includes a fleet management system 10 including a mobile position block 20, a display system 30, and a fleet mobile data suite 40. Display system 30 includes a raster database 50, a raster utility library 60, a vector database 70, a vector utility library 80, a mobile information data process (MID) 90, a Fleet Process 100, and a display 110.

In operation, positional information is first obtained from fleet mobile data suite 40. Typically fleet mobile data suite 40 includes a plurality of fleet vehicles, each including a navigational system, described above, in addition to a radio transceiver for sending (and receiving) data to mobile position block 20. In response to the data, mobile position block 20 processes the data, identifies the vehicles corresponding to the data, and passes the data to display system 30.

Upon receipt of the data from mobile position block 20, MID process 90 uses vector utility library 80 to access vector data from vector database 70. Fleet process 100 receives the data from mobile position block 20 and uses raster utility library 60 to retrieve an image of a map from raster database 50. Fleet process 100 also receives the data from MID process 90, and then displays the map and the vector information of display 110.

FIG. 2 illustrates a typical output display produced by one embodiment of the system in FIG. 1. The image 130 is typically displayed on a raster-scan display screen and can include a map portion 140 and a vector data portion 150. Map portion 140 includes an image of a geographical area, typically from the raster database or alternatively the vector database, and includes a number of icons 160 representing vehicle location. Vector data portion 150 includes data from the vector data base including present street location of the vehicle, closest-cross section streets, destination information, etc. As illustrated, vector data portion 150 also includes information regarding the operator, type of vehicle, status, etc. of vehicle in text form.

Map portion 140 and vector data portion 150 may be simultaneously displayed, may be alternatively displayed, may be displayed in different computer windows on the display, etc. Further information regarding the system in FIG. 1 can be found in co-pending application Ser. No. 08/443,062, filed May 17, 1995, now U.S. Pat. No. 5,636,122, issued Jun. 3, 1997 described above.

Further improvements to fleet management apparatus and methods providing enhanced graphical feedback of the status of a fleet, to a fleet manager and to fleet drivers will enhance efficiency.

SUMMARY OF THE INVENTION

The present invention relates to methods for graphically tracking the location and status of mobile transmitter units.

According to a one embodiment, a method for tracking a location of a transmitter with a computer system, the computer system coupled to a vector database includes the steps of determining the location of the transmitter, displaying a rasterized representation of a geographic area on a display, in response to the location of the transmitter, determining an icon associated with the transmitter, displaying the icon on the rasterized representation on the display, in response to the location of the transmitter, and outputting vector data in response to the location of the transmitter.

According to another embodiment, a method for tracking locations of transmitters with a computer system, the computer system coupled to a vector map database, includes the steps of determining a location of a first transmitter and a second transmitter, displaying a first rasterized representation of a first geographic area on a display, in response to the location of the first transmitter, and displaying a second rasterized representation of a second geographic area on the display, in response to the location of the second transmitter. The method also includes the steps of determining a first icon associated with the first transmitter, determining a second icon associated with the second transmitter, displaying the first icon on the first rasterized representation on the display, in response to the location of the first transmitter, displaying the second icon on the second rasterized representation on the display, in response to the location of the second transmitter, and outputting vector data in response to the location of the first transmitter and the second transmitter.

According to yet another embodiment, a method for graphically assigning jobs to vehicles with a computer system coupled to a vector database and a dispatching system, includes the steps of determining a location of a vehicle, displaying a rasterized representation of a geographic area on a display, determining a vehicle icon associated with the vehicle, and outputting vector data from the vector database in response to the location of the vehicle. The method also includes the steps of displaying the vehicle icon on the rasterized representation on the display, in response to the location of the vehicle, displaying a job icon on the display representing a job, in response to data from the dispatching system, and assigning the job to the vehicle by moving the job icon on top of the vehicle on the display.

According to another embodiment of the present invention, a computer program product includes a computer-readable media including code that receives a location of a vehicle, code that directs an output of a rasterized representation of a geographic area on a display, code that determines a vehicle icon from a plurality of different vehicle icons, associated with the vehicle, code that outputs vector data from the vector database in response to the location of the vehicle, and code that directs an output of the vehicle icon on the rasterized representation on the display, in response to the location of the vehicle. The computer-readable media also includes ode that directs an output of a job icon on the display representing a job, in response to data from the dispatching system, and code that assigns the job to the vehicle in response to the job icon being moved on top of the vehicle on the display.

DESCRIPTION OF PREFERRED EMBODIMENTS

1. Definitions

Raster Map: An image of a geographic area derived from a raster database.

Raster-scan display (Rasterized display): This is a well known display format in which an image is formed on a display screen by refreshing the image on the display in a left-to-right, top-to-bottom fashion. Televisions and computer displays, including flat-panel displays, typically output data in the raster-scan display format.

Vector Data: Data derived from a vector database.

Vector Map: An image of a geographic area derived from a vector map database. Typically inferior to raster maps because of relative lack of geographical elements such as landmarks and terrain, etc., however typically superior to raster maps in terms of compactness of the database.

Vector-scan display: This is a well known display format in which an image is formed on a display by directing an electron beam on the display by the use of vectors (pairs of coordinates). Computer Aided Design and Computer Aided Manufacturing engineering systems typically output data in a vector-scan display format.

2. System Overview

Figure 1:
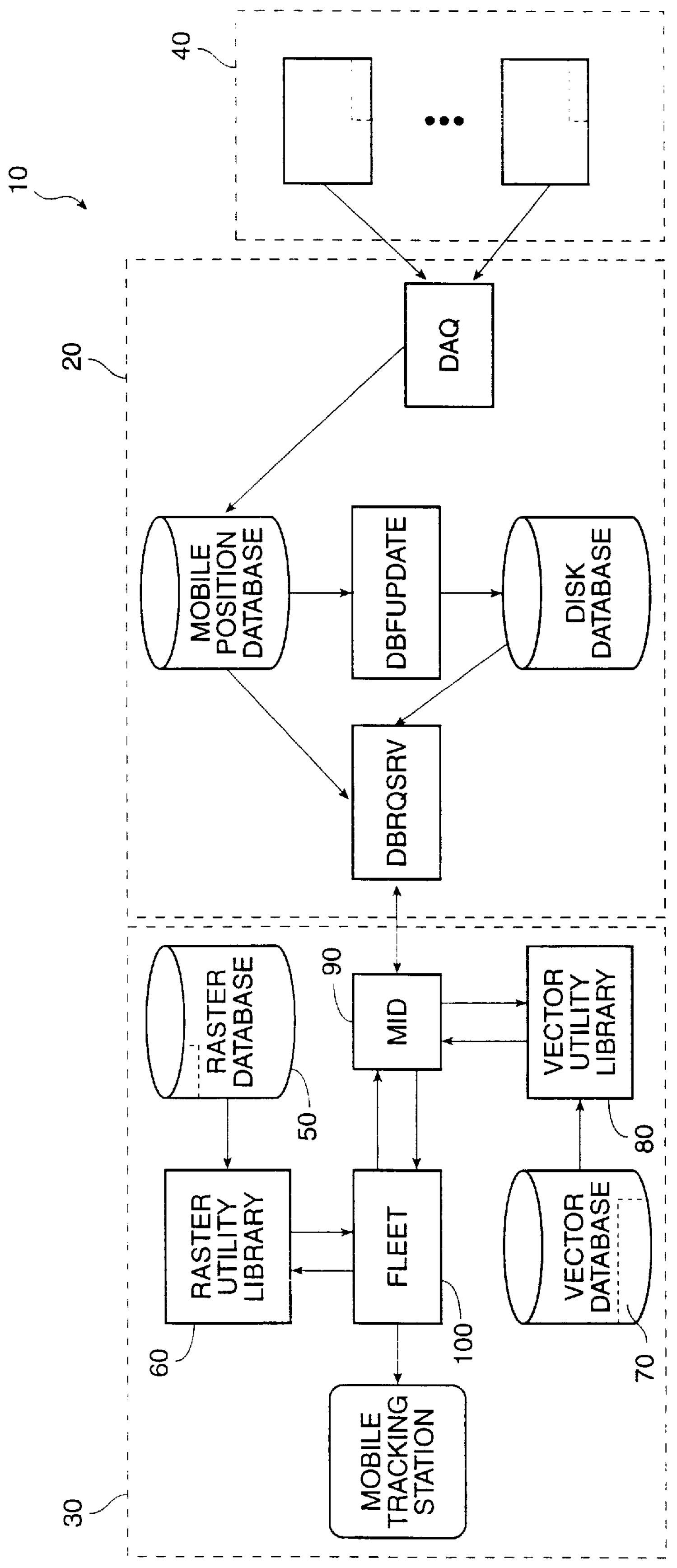
FIG. 1 illustrates one of the first fleet management systems that provided enhanced graphical displays to the fleet manager.
Figure 2:
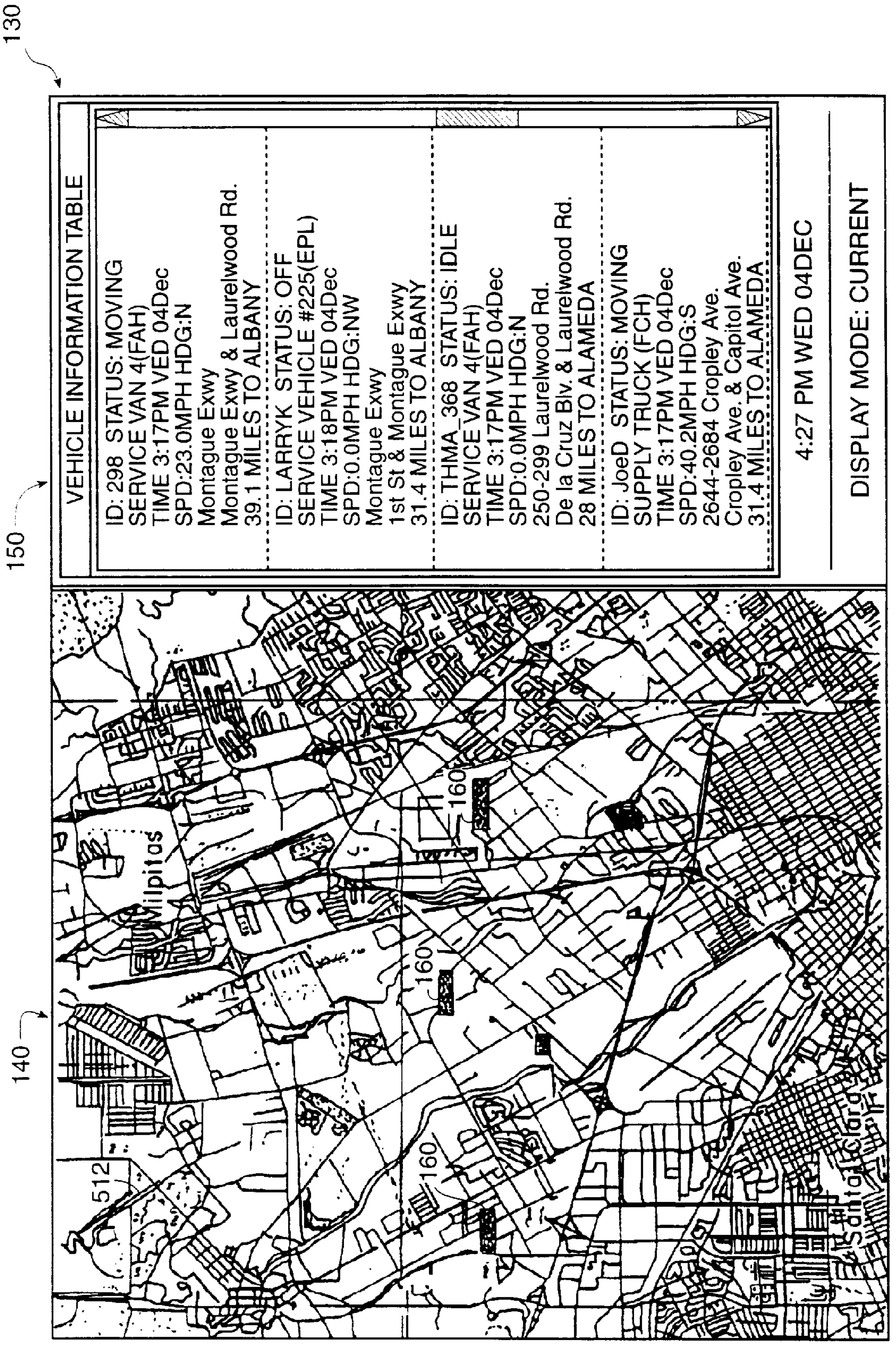
FIG. 2 illustrates a typical output display produced by one embodiment of the system in FIG. 1.
Figure 3:
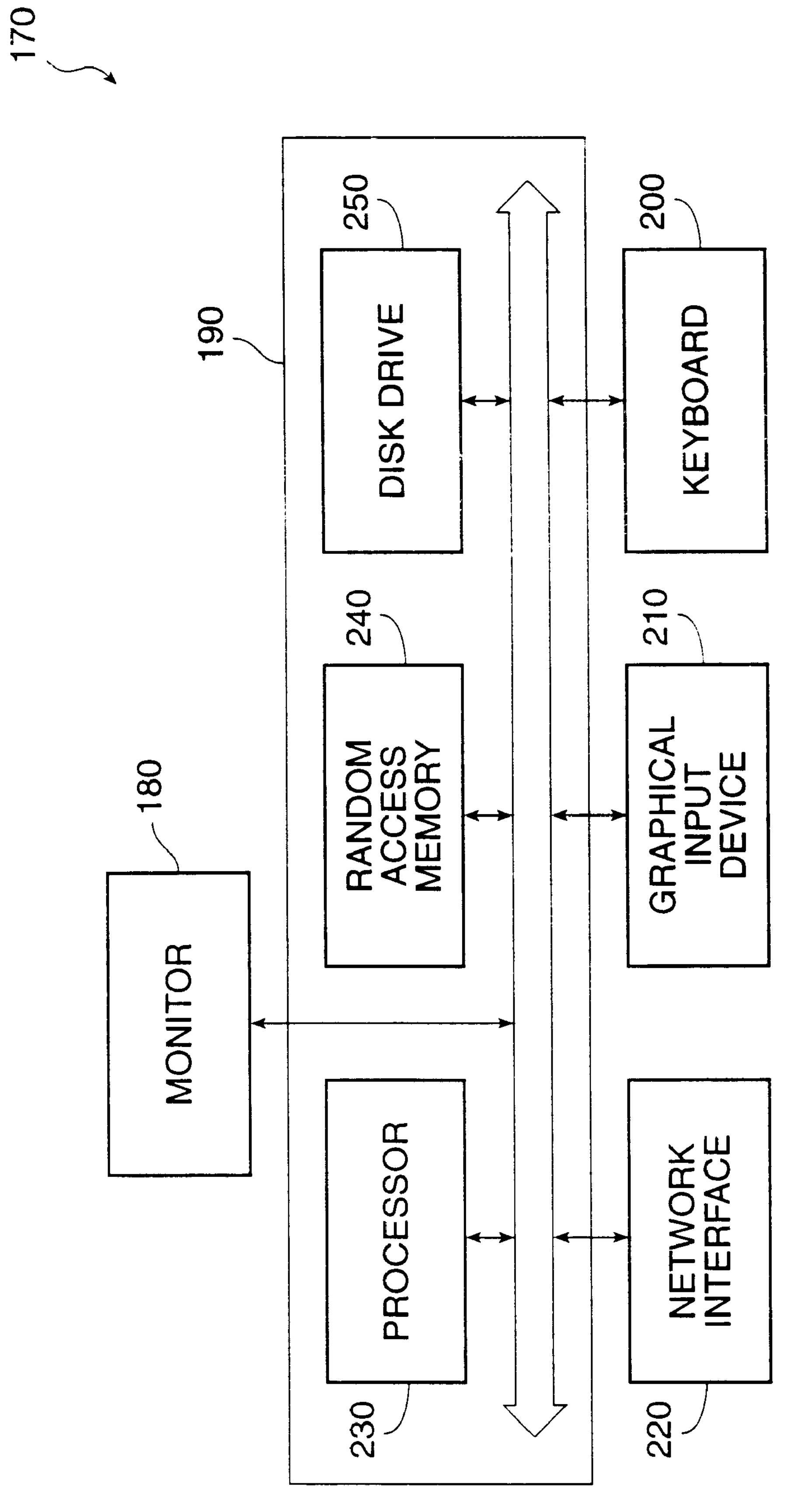
FIG. 3 illustrates a computer system according to a preferred embodiment of the present invention.

FIG. 3 illustrates a computer system according to a preferred embodiment of the present invention. System 170 includes a display screen (monitor) 180 a computer 190, a keyboard 200 a graphical input device 210, and a network interface 220. Computer 190 includes familiar computer components such as a processor 230 and memory storage devices, such as a random access memory (RAM) 240, a disk drive 250, and a system bus 260 interconnecting the above components.

A mouse is but one example of a graphical input device, also known as a pointing device, trackballs, light pens, and digitizing tablets are examples of others. RAM 240 and disk drive 250 are examples of tangible media for storage of computer programs such as embodiments of the herein described methods. Other types of tangible media include, merely for example, floppy disks and removable disks, optical storage media such as CD-ROMS and bar codes, and semiconductor memories such as flash memories, read-only-memories (ROMS), and battery-backed volatile memories.

The preferred embodiment of the present invention is implemented on a Sun Microsystems SparcStation 5, including 32 Megabytes of RAM and 1.5 Gigabytes of hard disk space. The SparcStation includes the Solaris 2.4 Operating System, X Windows Release 5, Motif Window Manager (MWM) 1.2.3, raster map to vector databases, and proprietary FleetVu (TM) software available from Mobile Information Systems, Inc. It is contemplated that other computer platforms such as '586 class based computer, Power PC based computers, SPARC and ULTRASPARC computers, etc. and other computer operating systems such as DOS, WINDOWS NT, MacOS, UNIX, etc. can be used to embody the present invention, and are thus included in alternative embodiments of the present invention.

3. Brief Overview

Figure 4:
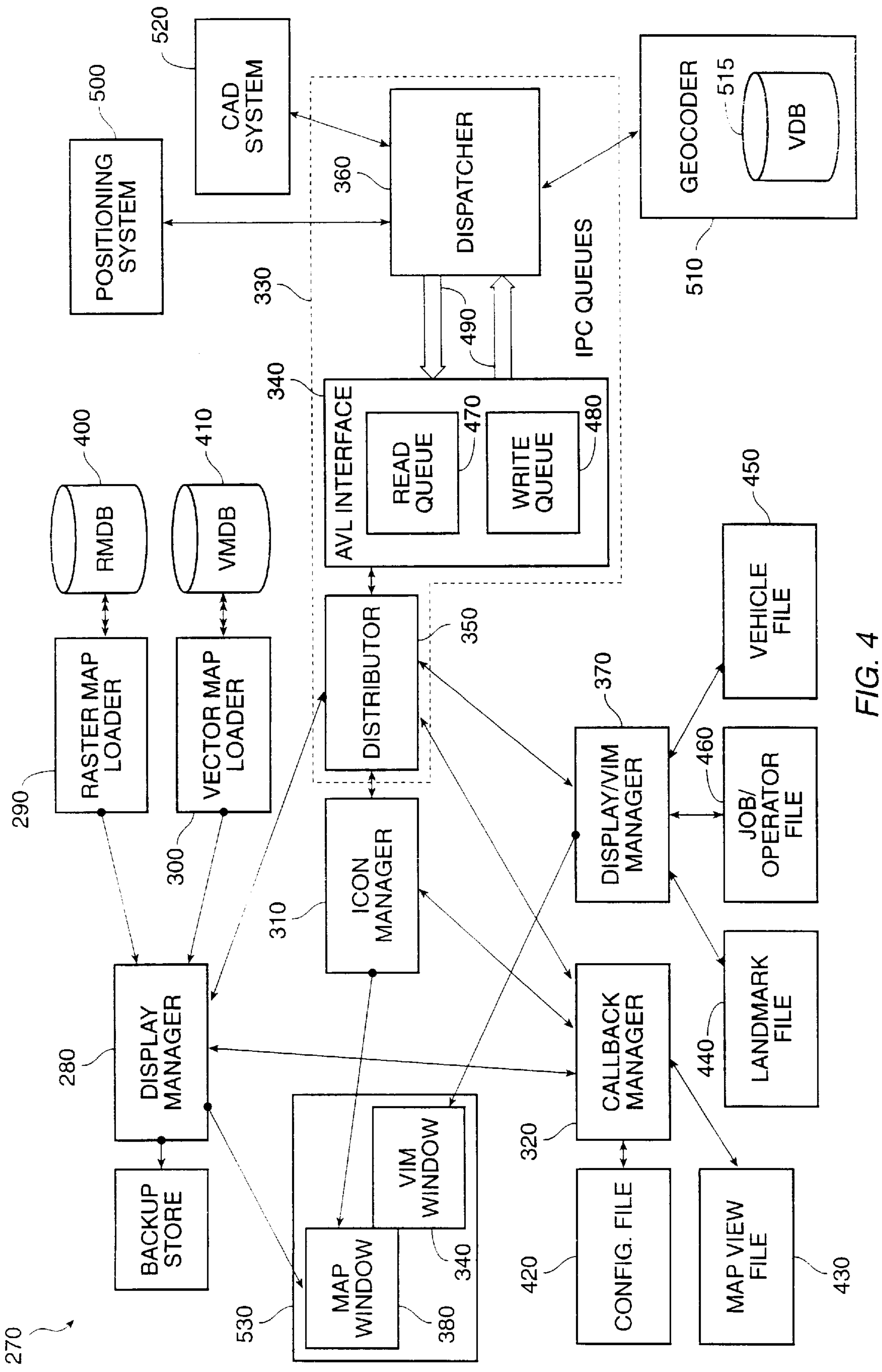
FIG. 4 illustrates a more detailed preferred embodiment of the present invention.

FIG. 4 illustrates a more detailed preferred embodiment of the present invention. System 270 preferable includes a display manager 280, a raster map loader 290, a vector map loader, an icon manager 310, a callback manager 320, a distributor system 330 including an automatic vehicle locator (AVL) interface 340, a distributor 350, and a dispatcher 360, a data manager 370, a map window 380, and a vehicle information matrix (VIM) window 390. System 270 also includes raster (map) database 400, vector (map) database 410, configuration files 420, map view files 430, landmark files 440, vehicle files 450, and job files 460. AVL interface 340 includes a read queue 470 and a write queue 480, and communicates with dispatcher 360 through IPC (Inter Process Communication) queues 480.

System 270 is typically coupled to a positioning system 500, a geocoder system 510, and a computer-aided-dispatch (CAD) system 520. Geocoder system 510 typically includes a vector database 515. Any available positioning system, geocoder system, or dispatching system can be used in conjunction with the below described methods and apparatus. Further information regarding these systems can be found in the above referenced co-pending applications.

As illustrated in FIG. 4, a physical display screen 530 is typically used to display information to the user. In particular, VIM window 390 displays vehicle information to display screen 530 and map window 380 displays a map to display screen 530. Superimposed on map window 380 are icons managed by icon manager 310.

Display Manager 280 is responsible for displaying maps on a physical display screen. The maps are shown on the display by using the services provided by this module.

Raster Map Loader 290 loads raster maps from raster map database 400 based on requests from Display Manager 280. The maps are converted from a native format, for example TIFF, to a format understood by Display Manager 280. The loaded maps are then passed back to Display Manager 280.

Vector Map Loader 300 generates vector maps from information in vector map database 410, based on requests from Display Manager 280. These vector maps are generated in a format understood by Display Manager 280. The generated maps are then passed back to Display Manager 280 for display.

Icon Manager 310 provides services, as will be discussed below, to display icon(s) on display screen 530.

Callback Manager 320 handles the user requests by processing the user input and then distributing the request to the appropriate modules. User generated events such as keyboard input, mouse clicks, etc. are also processed by this module.

Dispatcher 360 provides external communication with other process or programs such as positioning system 500 (Mtsmain Process Manager, Current Reports Receiver, History Reports Receiver), geocoder system 510, and CAD system 520. The functionality of the present invention thereby enhances the ease of use of such external systems.

AVL Interface 340 communicates with Dispatcher 360 via IPC queues 480. The messages received from Dispatcher 360 are passed on to Distributor 350. AVL Interface 340 comprises of Read Queue 470 and Write Queue 480.

Distributor 350 receives messages from AVL Interface 340. These messages are used to update Map Window 380 via Display Manager 280 and to update VIM window 390 via Data Manager 370. Distributor 350 also transfers requests for vehicle information, received from Callback Manager 320 to AVL Interface 470 and out to external processes.

Data Manager 280 maintains information about all the vehicles being tracked, landmarks, jobs, etc., manages VIM Window 390, and provides functions to access and update VIM window 390.

Map Window 380 is a computer window displayed on display screen 530 where a map is displayed and where the user interacts with the system 270. A first map window on display screen 530 is termed a "parent window and subsequent map windows are termed "child" windows.

VIM Window 390 is a computer window displayed on display screen 530 where a Vehicle Information Matrix (VIM) is displayed. As will be discussed, the VIM includes data derived from Vector Database 515 located in Geocoder system 510.

A VDT Manager (not shown) provides services to display and update a Vehicle Display Table (VDT) for a particular vehicle.

Further information regarding these systems can be found in application Ser. No. 08/697,825, filed Aug. 30, 1996 referenced above.

Upon start-up of system 270, Map Display 530 preferably shows, the lowest scale map in the map database. The map is annotated with all the currently user-enabled landmarks which fall within the map area boundaries currently displayed. The currently enabled landmarks are typically indicated by an icon along with descriptive text. The map also shows current location of vehicles which are being tracked, and which fall into the current map area boundaries being displayed. Each vehicle is indicated by an icon along with the vehicle identification (ID). The colors, shapes, and sizes of icons representing the vehicles, landmarks, operators, jobs, etc. on the map are user definable to correspond to different situations, as will be discussed.

The Vehicle Information Matrix (VIM) may also be displayed on display 530 upon start-up.

Figure 5:
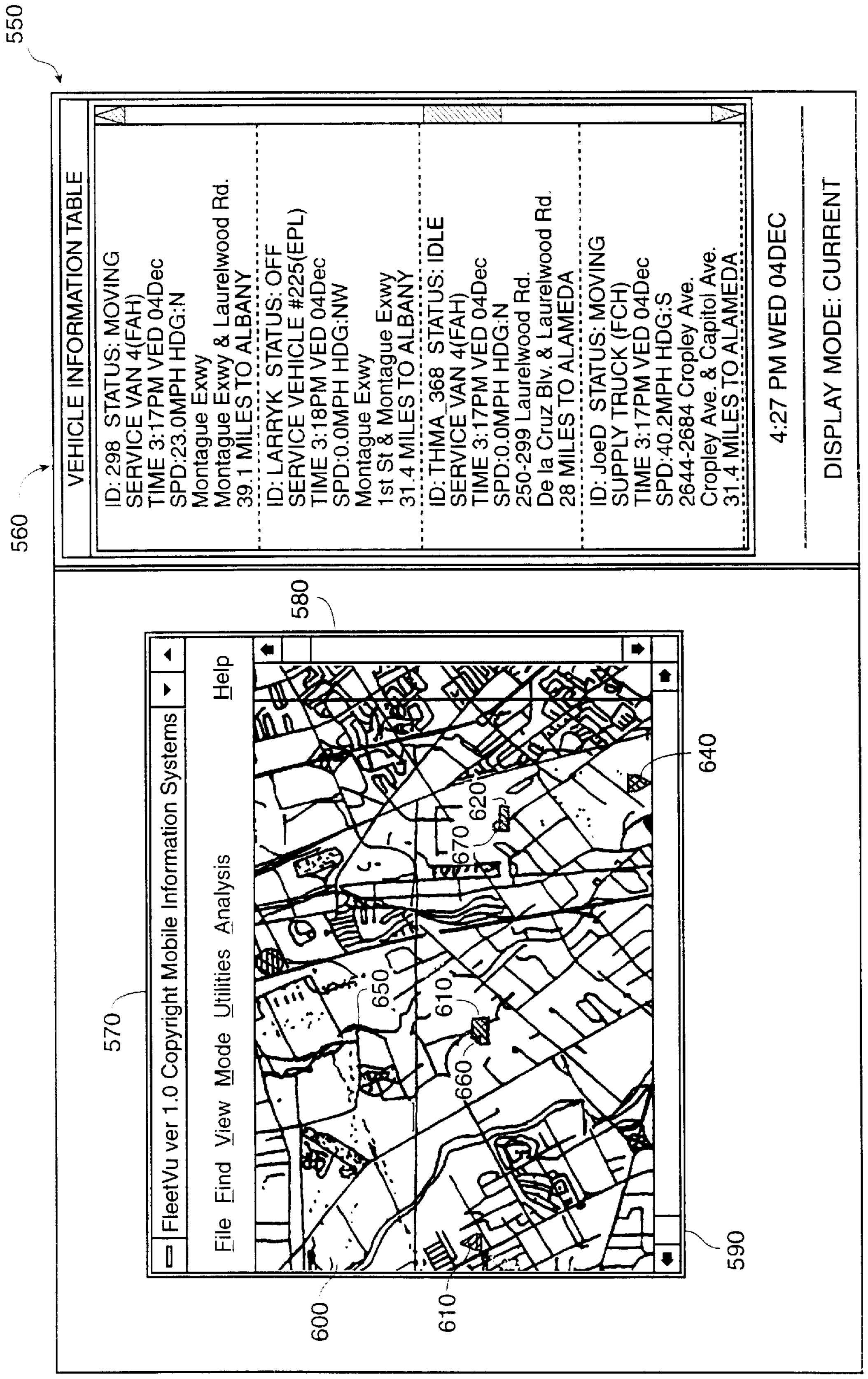
FIG. 5 illustrates a typical output display produced by an embodiment of the system in FIG. 4.

FIG. 5 illustrates a typical output display produced by an embodiment of the system in FIG. 4. FIG. 5 illustrates a display 550 including a VIM 560 and a map window 570. Map window 570 includes scroll bars 580 and 590 and a map 600. Map 600 includes vehicle icons 610 and 620, job icons 630 and 640, and landmark icon 650. Vehicle icons 610 and 620 include respective operator icons 660 and 670.

4. Functions for Display 4.1. Overview

Vector Map Database 410 and optionally Raster Map Databases 400 are included with System 270. These databases contain images and other information for generating or displaying maps used for output on display screen 530.

There are three terms that are used herein: map database, in-core map, visible map. The map database refers to the entire map database, either vector or raster on a computer-readable media, such as a disk. The in-core map refers to a portion of the map database retrieved from disk and stored in a display storage memory, such as Backup Store 375, prior to display. The visible map refers to the map area output in a display window on a display to the end user. In some cases, the three may cover the same geographic area (at the highest zoom level), in other cases, the three may be (vastly) different, due to the user zooming to different levels.

4.2. Displaying Raster and Vector Maps

The top level maps, i.e. the map covering the most geographic area are preferably raster maps. At the top most level, the maximum geographical area is covered (shown), but the least amount of detail will be provided. When the user zooms in, lesser amount of geographic area is covered, but a greater number of details are shown.

Lower level maps, covering a portion of the maximum geographic area are preferably vector maps. As above, when the user zooms in, lesser amount of area is covered, but greater number of details are shown.

In alternative embodiments of the present invention only raster maps are used, or only vector maps are used. As vector map technology increases, vector maps may begin to more accurately simulate the display of a raster map by being able to realistically illustrate geographic features such as terrain, forests, rivers, lakes, etc. Thus in effect, in the future, vector maps alone may provide the equivalent visual functionality provided by raster maps.

4.3. Map Scrolling

Upon start-up System 270 loads a map equal in size to the largest possible map window 380; this map is called the in-core map. When the visible display window size is made smaller than the in-core map, scroll bars are provided to enable the users to scroll to now obscured portions of the in core map, as illustrated in FIG. 5.

Scrolling related functionality is described below:

Smooth Scrolling: This refers to the scrolling of the map based on the user-input on the scroll bars with a cursor on display 530 or arrow keys on keyboard 200. The scrolling is continuous and the amount is based on the user input.

Scrolling Based on Re-centering: Using a pointing device to manipulate a cursor on display 520, the user points to a specific spot on a given map window. When the user clicks upon this spot, the map automatically scrolls until the selected spot is then shifted to approximately the center of the window map. The user initiates this function by using a menu option or a hot key.

More specifically, when the user selects a View>Re-center menu option, the mouse pointer changes shape to indicate that the user is now in the "re-center" mode. At this time, when the user clicks the left mouse button on the map area, the area under the mouse pointer is shifted to the approximate center of the map area.

Automatic scrolling: This feature is used only when the "Follow vehicle" option is activated. As will be discussed below, when in "follow vehicle" mode, in one embodiment the vehicle being followed is made stationary in the display window, then when the vehicle moves, the map underneath the vehicle scrolls. In another embodiment, the vehicle moves within the display window, but when the vehicle being followed reaches the boundaries of the map area (i.e., moves outside the geographical area currently displayed in the map area), the map is re-center such that the new position of the vehicle being followed is approximate in the center of the new map area.

4.4. Map Resizing

System 270 initially loads a map equal in size to the largest possible map window. When the physical map window size is smaller than the in-core map, the map is re-sized accordingly with a reference location, preferably the top, left corner, remaining in the same position in map window 380.

4.5. Zooming 4.5.1. Zooming

This feature permits users to view greater or lesser details of maps. At the highest level, the greatest geographical coverage and the least details are displayed, and at the lowest level the least geographical coverage and the maximum details are displayed. Zooming in this section can be done by selecting menu items or by using hot keys.

To zoom into a map using the menu item, the user selects a View>Zoom In menu option. At this time the mouse pointer changes shape to indicate that the system is now in the "zoom in" mode. When the user clicks on the map, the map is "zoomed into". A smaller geographical area is shown in greater detail. The point where the mouse was clicked is now positioned in the center of the map area.

Similarly, to the "zoom in" function, using the menu item, the user selects the View>Zoom Out menu option. At this time the mouse pointer changes shape to indicate that the system is now in the "zoom out" mode. When the user clicks on the map, the map is "zoomed out". A larger geographical area is shown in lesser detail. The point where the mouse was clicked is now positioned in the center of the map area.

To "zoom in" using the hot key, the user positions the mouse pointer on the map where the "zoom in" is desired, and presses the F2 key. The map is "zoomed into" and a smaller geographical area is shown in greater detail in a similar manner described. Similarly to zoom out using the hot key, the user positions the mouse pointer on the map where the "zoom out" is desired, and presses the F3 key. The map is "zoomed out" and a larger geographical area is shown in lesser detail in a similar manner described above.

When a raster map is displayed, when a zoom function is involved, another raster map is retrieved and displayed to the user. When a vector map is displayed, when a zoom function is invoked, another vector map is generated and displayed to the user. In both map modes, typically there are a limited number of zoom-in or zoom-out functions. Further information is disclosed in co-pending application Ser. No. 08/697,825, filed Aug. 30, 1996 described above.

4.5.2. Rubberbanding Zoom

This feature permits users to view greater or lesser details of maps by using a pointing device and a cursor on display 530. Using the mouse, the user draws a "rubber band" box on map window 380 to delimit a geographical area into which the user wishes to zoom to.

In the preferred embodiment, rubberbanding is performed as follows: First the user clicks on the View>Select function in the menu bar. The cursor changes shape on display 530 to indicate that the user in the system is now in the rubberbanding mode. The user then defines a "rubber banded" region with the mouse map by pressing the left button of the mouse and dragging the mouse while keeping the left button pressed. Once the "rubber band" is drawn, display manager 280 directs vector map loader 300 to generate the appropriate vector map.

If the rubber band is drawn on a raster map or a vector, the map area chosen is displayed from vector database 410 (i.e., the map displayed will be vector map).

When the user uses rubber banding to zoom in, the scale after zoom in will be such that the area delimited by the "rubber band" will cover the map area in the window.

At any time, the user can zoom out to the highest level by selecting the View>"Zoom out" menu option. At this point, the map will be the highest scale map in the map database.

4.6. Displaying Icons, Landmarks and Jobs 4.6.1. Icons

In the preferred embodiment of the present invention, numerous marks are superimposed upon the displayed maps. These marks include icons representing locations of vehicles, landmarks, jobs, operations, etc. This is preferably transferred from computer-aided dispatch systems, positioning systems, etc., see application Ser. No. 08/443,063, filed May 17, 1995, now U.S. Pat. No. 5,758,313, issued May 26, 1998. Information from any standard database, however can be a source of data.

Figure 26:
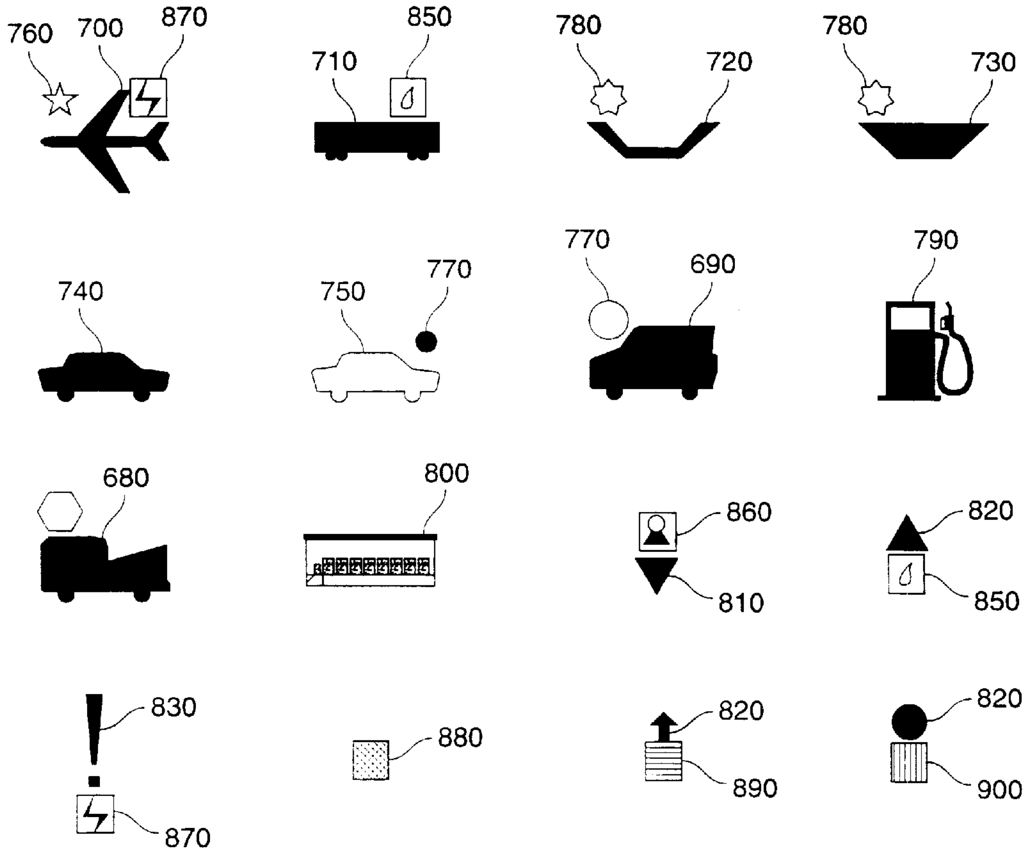
FIG. 26 illustrates a preferred embodiment of the Job information table.

FIG. 26 illustrates examples of icons useable in the preferred embodiment of the present invention. FIG. 26 is merely illustrative and not limited to those shown.

Vehicles being tracked are shown on the map area using vehicle icons. The vehicle icons are displayed on both the raster as well as the vector maps. The following preferred parameters can be set for vehicle icons: the shape, the size, the colors, blinking/steady, etc. For example, the shape of the vehicle may represent the type of vehicle, e.g., a tow truck 680, a refrigerated truck 690; a passenger jet 700, a freight train box car 710, etc.; the shape may also represent whether the vehicle is empty 720 or is carrying cargo 730, etc. Further, the color of the icon may also represent the type of vehicle or the status of the vehicle, as described above, also, the color can represent whether the vehicle is stopped 740 or moving 750, or whether the vehicle is on assignment 760. Also, the icon can blink when there is an alarm condition such as a late delivery, an accident, the operator is speeding, etc. Combinations and permutations of the above are within contemplated embodiments of the present invention.

Vehicle operators can also be shown on the map area using operator icons. The icons are displayed on both the raster as well as the vector maps. The following preferred parameters can be set for job icons: the shape, the size, the colors, blinking/steady, etc. For example, the shape of the operator icon may represent the type of operator e.g., airplane pilot 760, truck driver 770, a ship pilot 780, etc.; the size may represent the relative size of the crew required, for example a pilot and a co-pilot, a single driver, or a loading crew, etc. Further, the color of the icon may represent operator shift, or the type of operator as described above. The icon can blink when there is an alarm condition such as operator overtime, etc. Combinations and permutations of the above are within contemplated embodiments of the present invention.

Landmarks can also be shown on the map area using landmark icons. The icons are displayed on both the raster as well as the vector maps. A landmark is a location of interest to an user. E.g. street corners, cities, office building, Post Offices, port facilities, job locations, geographic features, such as forests, sand, etc. The following preferred parameters can be set for landmark icons: the shape, the size, the colors, blinking/steady, etc. For example, the shape of the landmark may represent the type of landmark e.g., a re-fueling station 790, a customs warehouse 800, a job location 810, etc.; the shape may also represent whether the job is a pick-up 820 or a drop-off 810, a rush job 830, etc. Further, the color of the icon may also represent the importance of the job location, or the hours of dock operation for the location. Also, the icon can blink when there is an alarm condition such as a late delivery. Combinations and permutations of the above are within contemplated embodiments of the present invention.

In the preferred embodiment of the present invention, different classes of landmarks are provided. For example, a class of "airports" will highlight on the map, locations of airports available, and a class of "hospitals" will highlight on the map, locations of hospitals. By being able to highlight classes of landmark icons on the map, the user has a quick visual feedback on the location of the vehicles relative to user selected landmarks.

Jobs can also be shown on the map area using job icons. The icons are displayed on both the raster as well as the vector maps. A job is preferably a physical item that needs to be transported from one location to another. The following preferred parameters can be set for job icons: the shape, the size, the colors, blinking/steady, etc. For example, the shape of the job icon may represent the type of job e.g., petroleum products 850, heavy equipment 860, electronics 870, etc.; the size may also represent the relative size of the job, for example if two or more vehicles are required for a job, two job icons are placed side by side. Further, the color of the icon may also represent the importance of the job, or the type of job, for example, refrigerated cargo 880, vehicles 890, small packages 900, etc. The icon can blink when there is an alarm condition such as a late job 910. Combinations and permutations of the above are within contemplated embodiments of the present invention.

Combinations and permutations of the above are within contemplated embodiments of the present invention.

4.6.2. Display Modes

In the preferred embodiment of the present invention, two types of data, preferably from a positioning system, is displayed: either current data or historical data.

In the current mode, the latest position of vehicles is shown, and updated as reports are received from the positioning system. To enter the current mode, the user selects the Mode>Current mode menu option.

In historical mode, a set of status reports for a specific vehicle for a specific (elapsed) time period is displayed. Historical data is collected before entering historical mode. If no historical data has been collected, the Mode>History Mode menu option is deactivated.

Figure 6:
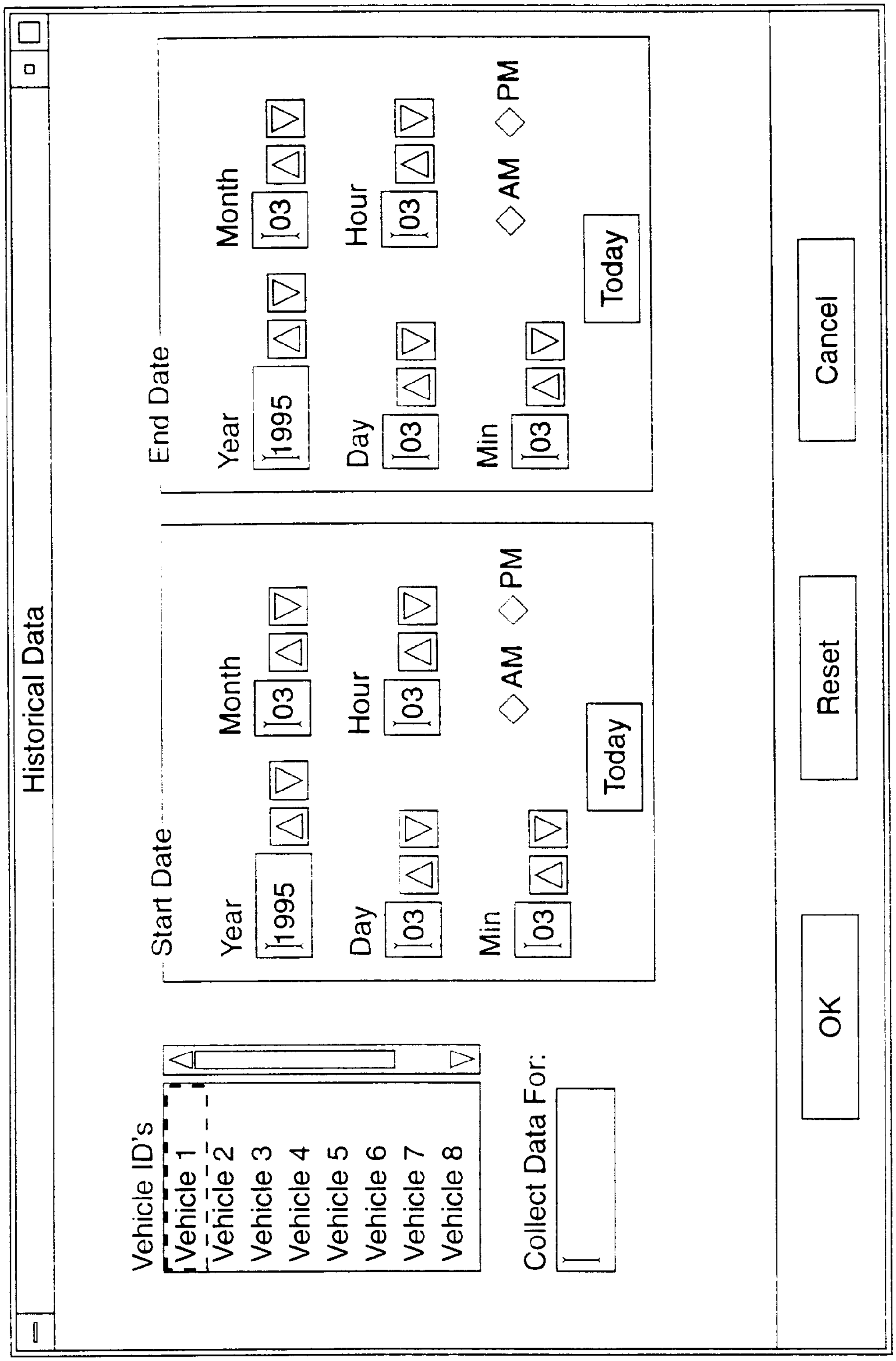
FIG. 6 illustrates a preferred embodiment of a historical data dialog box.

To collect historical data the user selects a Mode>Historical data menu option and then selects the vehicle of interest from a dialog box. FIG. 6 illustrates a preferred embodiment of a historical data dialog box. As illustrated in FIG. 6, all the vehicle IDs are displayed in a scrolling list. From this list, the user can click on one or multiple vehicles to collect data for. Alternatively, historical data is automatically saved for all vehicles for future analysis.

When historical data is retrieved the following actions are taken: the current positions of vehicles are erased and replaced with a display of vehicle icons placed at each historical location of the specified vehicle, connected by line segments. The color of the lines from that icon, and the color of the icons reflect the status of the vehicle at that point. The map is scrolled such that the first sequence of the historical data is approximately centered in the map area, and so on.

When retrieving historical data, preferably more than one vehicle data can be illustrated to the user, at a time.

5. Multiple Map Display

In the preferred embodiment of the present invention the user can see more than one part of a geographical area at a time. In order to accomplish within the confines of the physical display, the user opens multiple maps, one for each geographical area. The first map window displayed, typically the map with the least magnification, is referred to as the parent window and subsequent map windows are referred to as "child" window. Thus for example, the parent window may display a particular geographic area, for example the San Francisco Bay Area, on the parent window, icons of vehicles, etc. are superimposed. If the user is interested in the status or location of a specific job, a child window is opened centering on that particular vehicle. In that child window, the zoom level is independent of the parent window, thus the child window may cover a smaller geographic area, for example, downtown Palo Alto, Calif. Naturally, if a vehicle icon is displayed in more than one map, and the location of that vehicle changes, all the maps are updated.

The user can open a new map upon selecting File>Open Map menu option from the main window. The new map is displayed in a separate window ('child' window). This separate window looks identical to the main window and has the same functionality, except for particular functions in the menu bar.

In particular, the File>Open Map menu option is not provided because it may become complex if the user is allowed to open child windows indefinitely from other child windows. It will be difficult to keep track of open windows (and update them).

Further, the File>Setup menu option is not provided because this is a global option for the entire system. Hence the user is allowed access to this option only from the main window. Also, there is only one Vehicle Information Manager 370 for all the windows. Therefore, it should be configured from one central location.

Also, the Utilities>Brightness menu option is not available. This is because there is only one color map is used for all windows. Hence, when one window's brightness is adjusted, all windows will become brighter or darker as the case may be.

6. User Functions 6.1. Find Utilities

Figure 7:
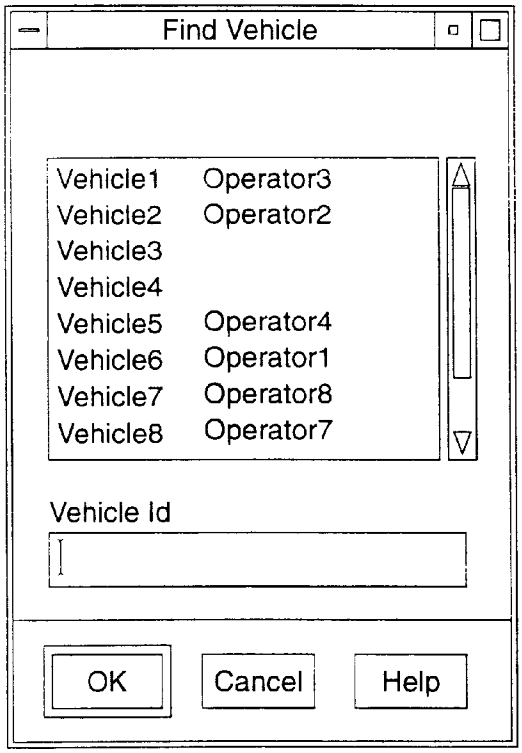
FIG. 7 illustrates the Find>Vehicle dialog box.

In the preferred embodiment of the present invention, the find utility allows the user to center the map and display the current/historical information about a designated vehicle operator, landmark, job, etc. When a find utility is invoked, a dialog (with an 'OK' and 'Cancel' buttons) is popped up to get information in order to perform the find. The following find functions are provided:

Find>Vehicle—When this menu option is selected, a dialog box appears from which the user can select a vehicle. FIG. 7 illustrates the Find>Vehicle dialog box. The user can either select a vehicle by scrolling from the list or by typing-in the vehicle name in the text box provided.

In the preferred embodiment of the present invention, when this command is invoked, the vehicle information matrix (VIM) discussed earlier is also automatically scrolled such that the selected vehicle information is displayed to the user.

Figure 8:
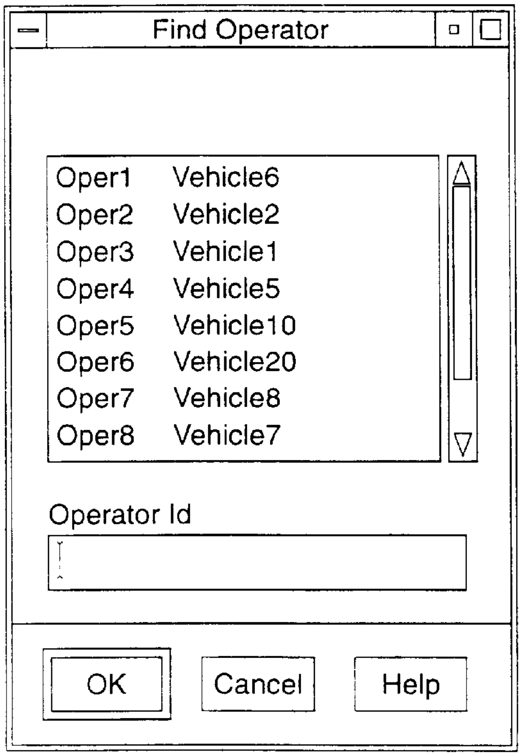
FIG. 8 illustrates the Find>Operator dialog box.

Find>Operator—When this menu option is selected, a dialog box appears from which the user can select operators to find. FIG. 8 illustrates the Find>Operator dialog box. The user can either select an operator from by scrolling list or typing-in the operator name in the text box provided.

In the preferred embodiment of the present invention, operators may or may not be assigned to specific vehicles or specific jobs. When the operator is selected who is assigned to a particular vehicle, the vehicle information is also displayed. Further, the Vehicle Information Matrix, if visible is scrolled to display the operator at the top of the matrix.

Figure 9:
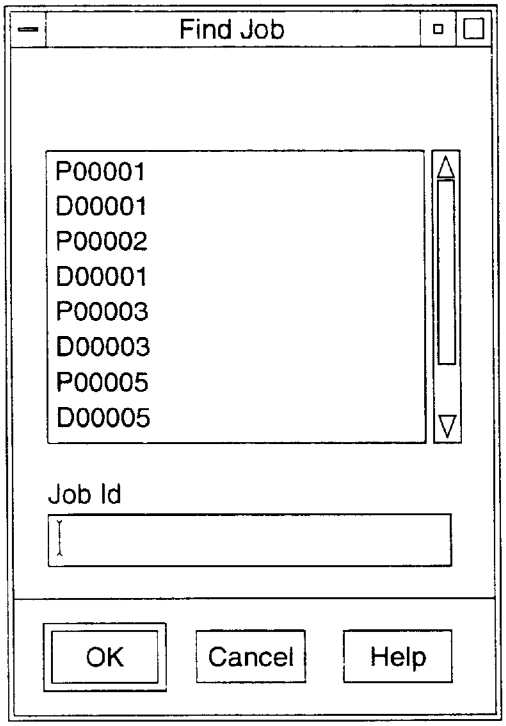
FIG. 9 illustrates the Find>Job dialog box.

Find>Job—When this menu option is selected, a dialog box appears from which the user can select jobs to find. FIG. 9 illustrates the Find>Job dialog box. The user can either select a job from by scrolling list or typing-in the job name in the text box provided.

In the preferred embodiment of the present invention, jobs may or may not be assigned to specific vehicles or operators. When the job is selected that is assigned to a particular vehicle, the vehicle information is displayed. If the Vehicle Information Matrix is visible, the distance of each vehicle from the chosen job location is calculated; and then vehicles are sorted in order of ascending distances from the chosen job location to each vehicle.

Figure 10:
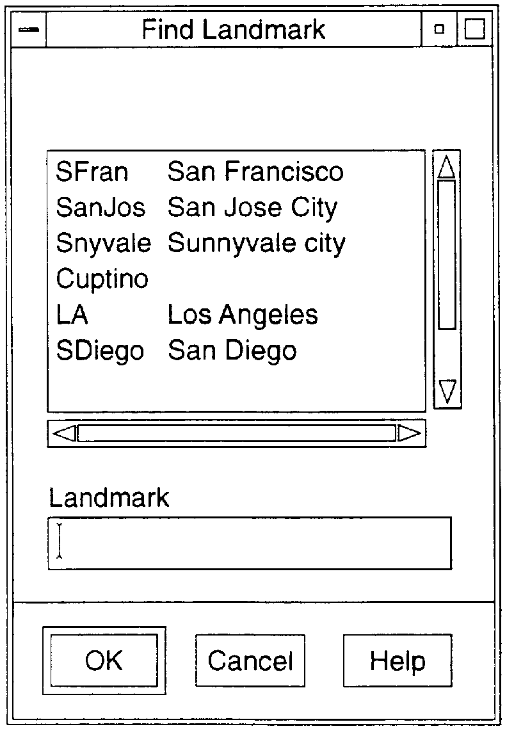
FIG. 10 illustrates the Find>Landmark dialog box.

Find>Landmark—When this menu option is selected, a dialog box appears from which the user can select a landmark to find. FIG. 10 illustrates the Find>Landmark dialog box. The user can either select a landmark from by scrolling list or typing-in the landmark name in the text box provided.

This is available in history, current, job view, or follow vehicle modes and is used to find a location of interest to the user. After specifying the landmark, if the Vehicle Information Matrix is visible the distance of each vehicle from the chosen landmark is calculated; and the matrix is sorted in ascending distances from the chosen landmark to each vehicle.

Find>Sequence—This is available only in the historical mode and is used to find a vehicle based on the sequence number.

Figure 11:
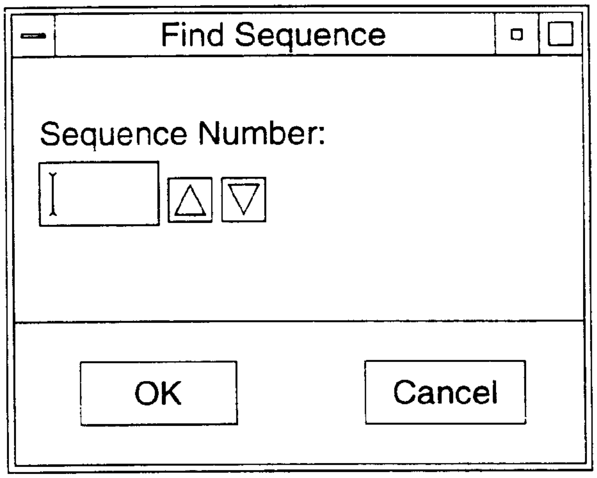
FIG. 11 illustrates the Find>Sequence dialog box.

When this menu option is selected, a dialog box appears from which the user can select a historical sequence to find. FIG. 11 illustrates the Find>Sequence dialog box. The user can either select a landmark from by scrolling list or typing-in the landmark name in the text box provided. If the VIM is visible, the sequence is displayed at the top of the matrix.

6.2. Vehicle Locate

Figure 12:
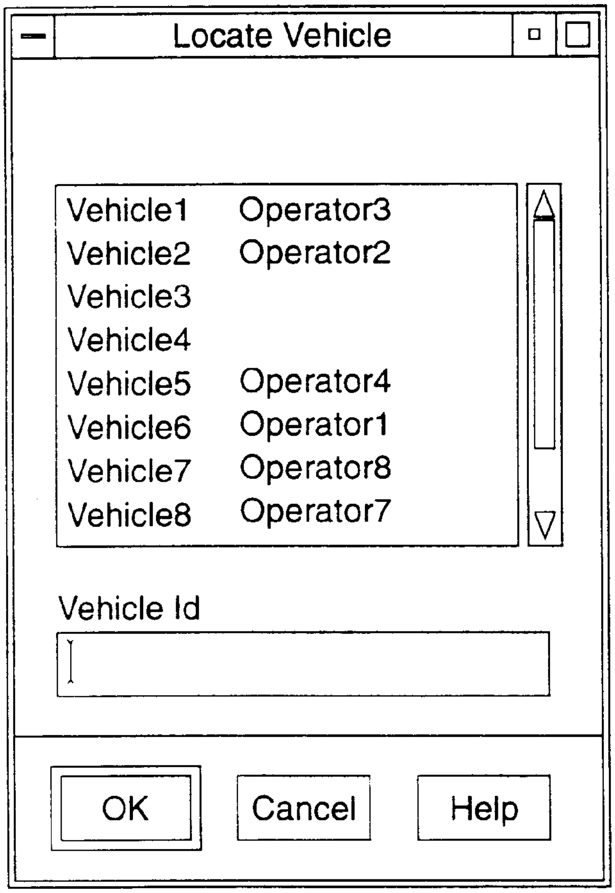
FIG. 12 illustrates the Utilities>Locate Vehicle dialog box.

The Vehicle locate function allows the user to query which vehicles are located around a given location, in the current or job view mode. When the user selects the Utilities>Locate Vehicles menu option, and then clicks the cursor on the map at a desired location, the mouse pointer changes shape to indicate that the system is in the "Locate Vehicle" mode, and a dialog box appears. FIG. 12 illustrates the Utilities>Locate Vehicle dialog box. This dialog contains the names of vehicles which are located within a user-defined distance from the selected map location. Selecting a vehicle from the displayed list results in the Vehicle Data Table being displayed for that vehicle.

6.3. Vehicle Update

Figure 13:
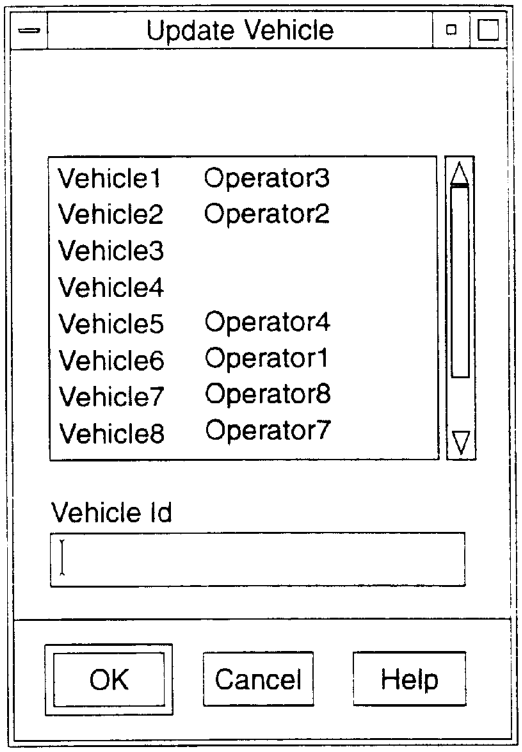
FIG. 13 illustrates the Utilities>Update Vehicle dialog box.

The Vehicle update function allows the user to receive a status report for a user-selected vehicle, in the current mode. When the user selects Utilities>Update Vehicle option from the menu, and then clicks the mouse pointer on the map at a desired location, the mouse pointer changes shape to indicate that the system is in the "Update Vehicle" mode, and a dialog box appears. FIG. 13 illustrates the Utilities>Update Vehicle dialog box. This dialog contains the names of vehicles which are located within a user-defined distance from the selected location. When the user selects a vehicle from this list, a polling request is sent to the vehicle. The positioning data received from the vehicle is then used to update the Vehicle Information Matrix and vehicle icon in the map area.

6.4. Follow Vehicle

Figure 14:
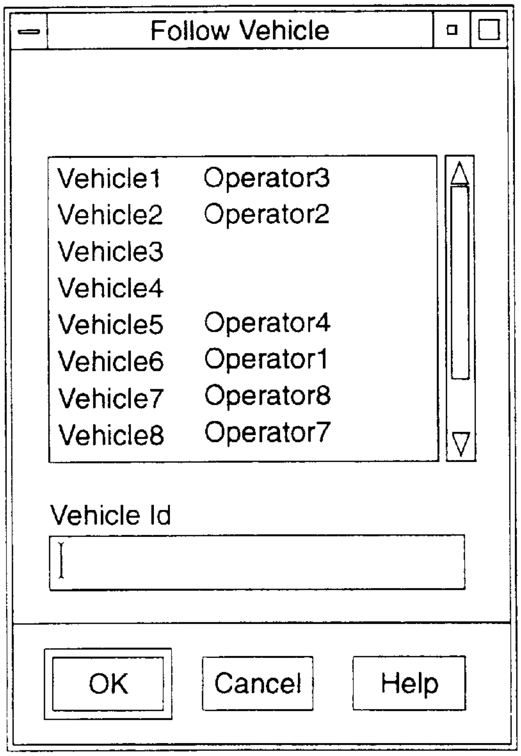
FIG. 14 illustrates the Mode>Follow Vehicle dialog box.

The Follow Vehicle function allows the user to track a vehicle of interest. When the user clicks on the Mode>Follow Vehicle menu option, the window enters the "follow vehicle" mode, and a dialog box appears. FIG. 14 illustrates the Mode>Follow Vehicle dialog box. This dialog contains the names of the vehicles that can be followed. The user selects the vehicle to be followed by clicking on a vehicle from the list.

When a vehicle is being followed, a vehicle icon is initially placed in the center of the map and all other vehicle icons are cleared. As the vehicle moves, the vehicle icon on the map moves and when the vehicle icon reaches the edge of the map area, the map is automatically scrolled to position the icon in the center of the map area. Alternatively, the map area may be scrolled continually when the vehicle moves, such that the vehicle icon remains roughly centered within a map window in this mode.

6.5. Alarm Messages

Figure 15:
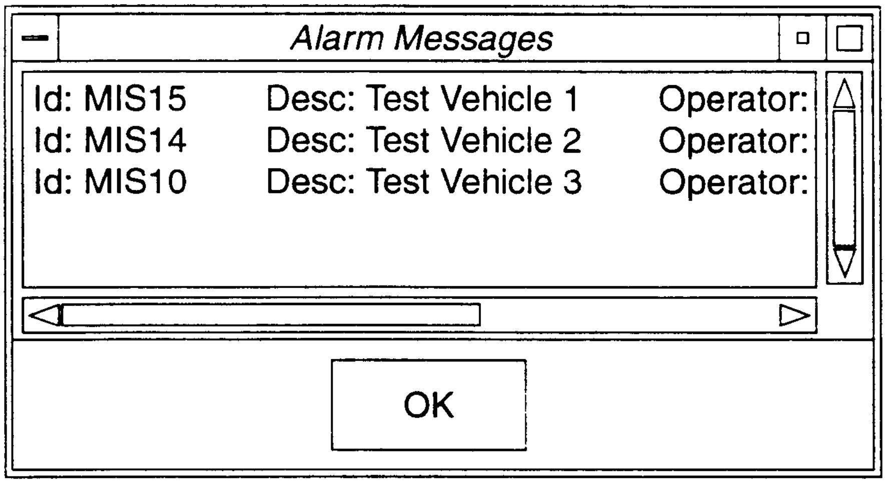
FIG. 15 illustrates an Alarm dialog box displaying alarm messages.

The Alarm Message feature alerts the user when vehicles report alarm conditions. Upon receipt of an alarm, the main map (i.e., the parent window)(s) is(are) approximately centered around the vehicle sending the alarm, and a dialog box appears. FIG. 15 illustrates an Alarm dialog box displaying alarm messages. In the preferred embodiment of the present invention, an alarm condition may be a security alarm, an alarm indicating that a delivery or pick-up is late, etc.

6.6. Proximity Calculation

Figure 16:
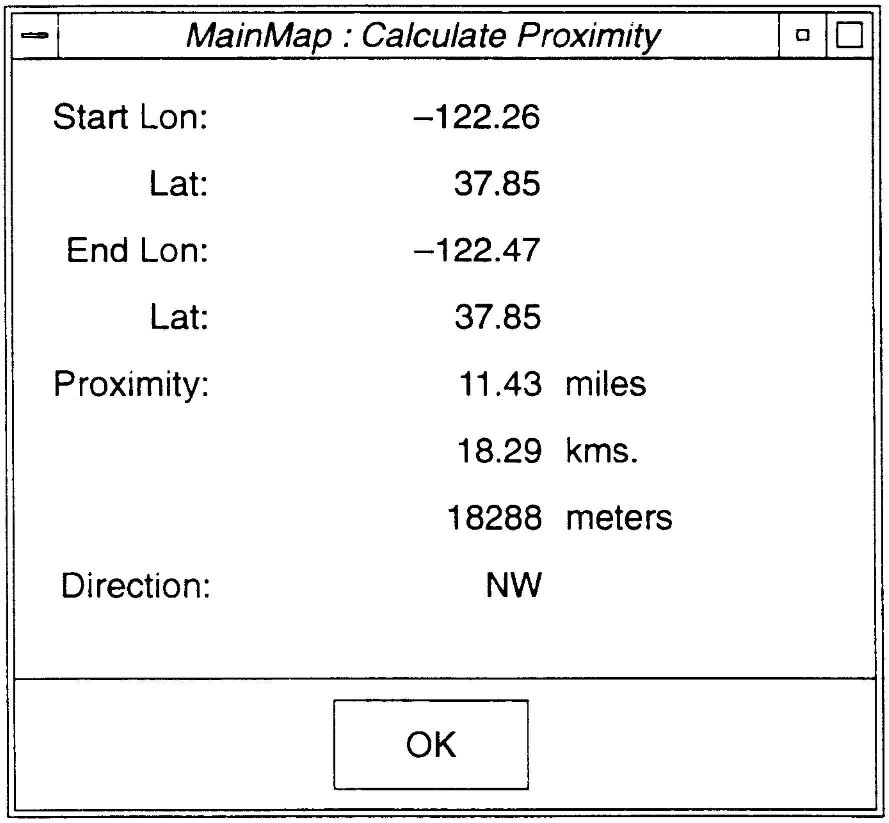
FIG. 16 illustrates the proximity calculation dialog box.

The Proximity calculation function is used to calculate and display the distance between (selected) locations in the map area. Upon selecting the Utilities>Calculate Proximity menu option, the system enters the "proximity calculation" mode. The user is then prompted to select any point on the map area. After selecting the first point, the user selects a second point. These two points are joined by a line to indicate that the user has selected these two points. After the second point is selected, the user may continue to select more points on the map (and these points will be joined by a line). At each stage, the distances between the first point and last points are displayed in a dialog box. FIG. 16 illustrates the proximity calculation dialog box.

In an alternative embodiment, a vehicle or a landmark or an operator, etc. may automatically be defined as one end point in this calculation. Thus the user simply clicks a second point on the map display to initiate the proximity calculation. Examples of use of this feature include estimating the distance or time for a vehicle to reach a destination, or in a golf course application, estimating the distance from a golfer to the pin.

6.7. Geocoding

Geocoding is defined herein as the back or forth conversion of a street address (as understandable to a human) to a real world coordinate (i.e., latitude and longitude).

Figure 17:
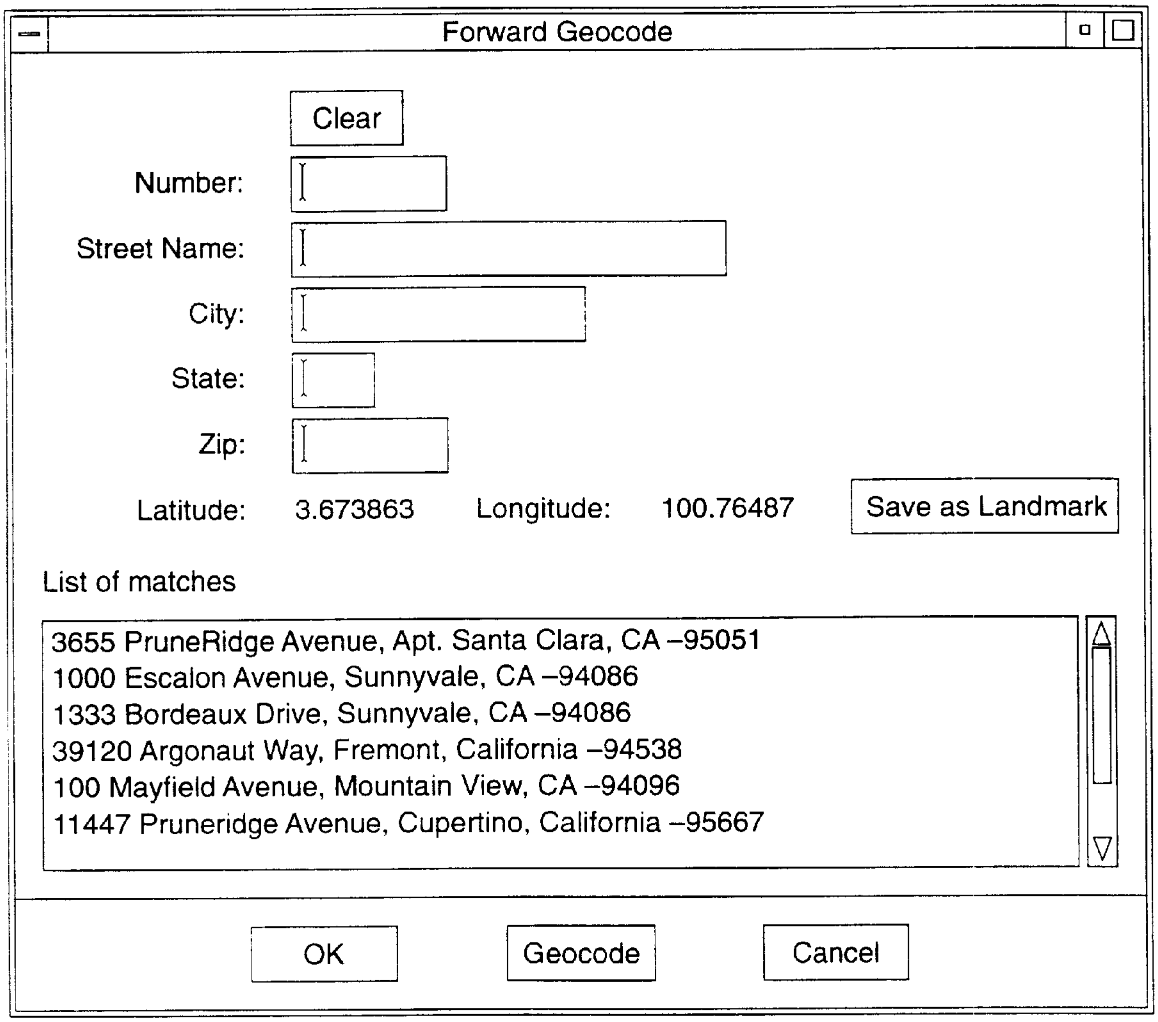
FIG. 17 illustrates the Forward Geocode dialog box.

Forward Geocoding refers to the conversion of an address to a real world coordinate. When the user selects the Utilities>Geocode>Forward menu option, a dialog box appears. FIG. 17 illustrates the Forward Geocode dialog box. In this dialog the user enters the address to be located on the map. After entering the address, the longitude and latitude is calculated and the map is approximately centered around the address. This function preferably relies on an external geocoder such as geocoder 510.

Figure 18:
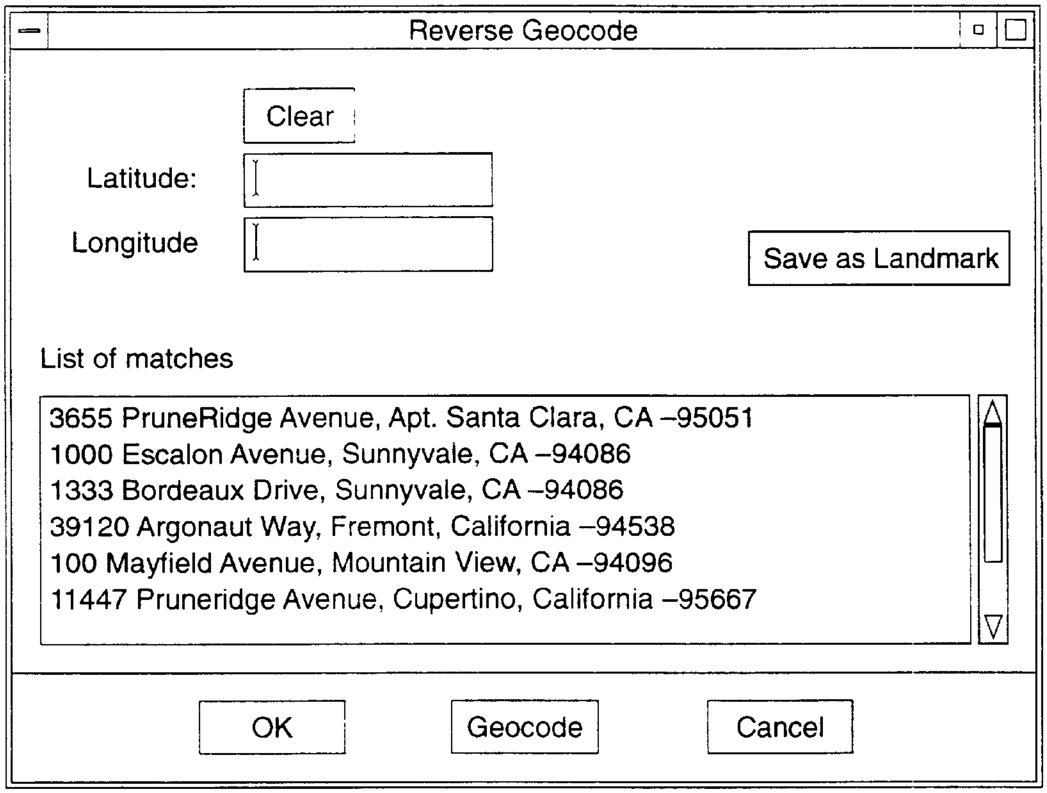
FIG. 18 illustrates the Reverse Geocode dialog box.

Reverse Geocoding refers to the conversion of a coordinate on the display to an approximate street address. When the user selects the Utilities>Geocode>Reverse menu option, the mouse pointer changes shape to indicate that the user is in now in the "reverse geocode" mode. Next, the user clicks on a position on the map where an address is required, and in response a dialog box appears. FIG. 18 illustrates the Reverse Geocode dialog box. In this dialog, typically a list of possible addresses are presented to the user. In the preferred embodiment of the present invention, the longitude/latitude (L/L) is first calculated from the cursor coordinates on the map, then, preferably geocoder 510 is passed the L/L. In response, geocoder 510 returns a list of possible street addresses. In case illustrated, if a unique address is not found, a list of possible matches are displayed in the scrolling list.

6.8. Landmark Preferences

Figure 19:
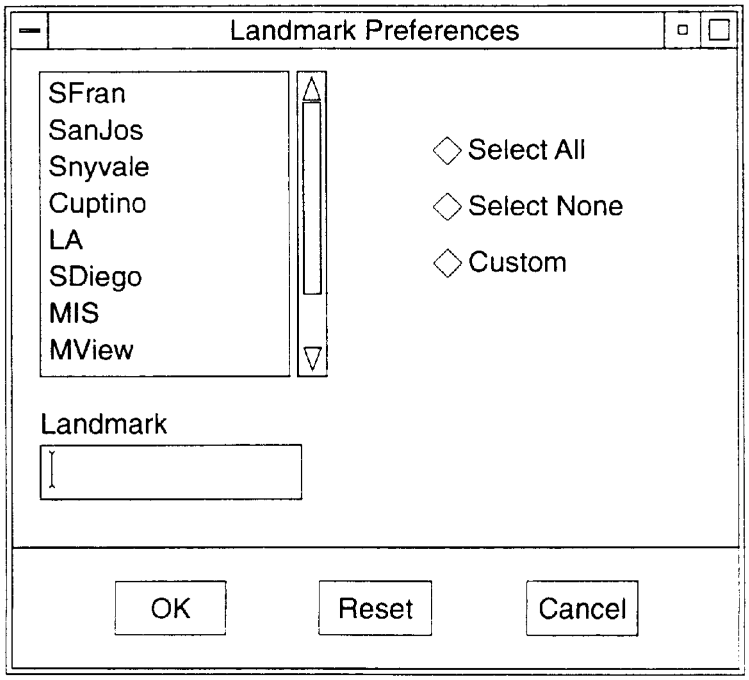
FIGS. 19 and 20 illustrates the Utilities>Landmark dialog.
Figure 20:
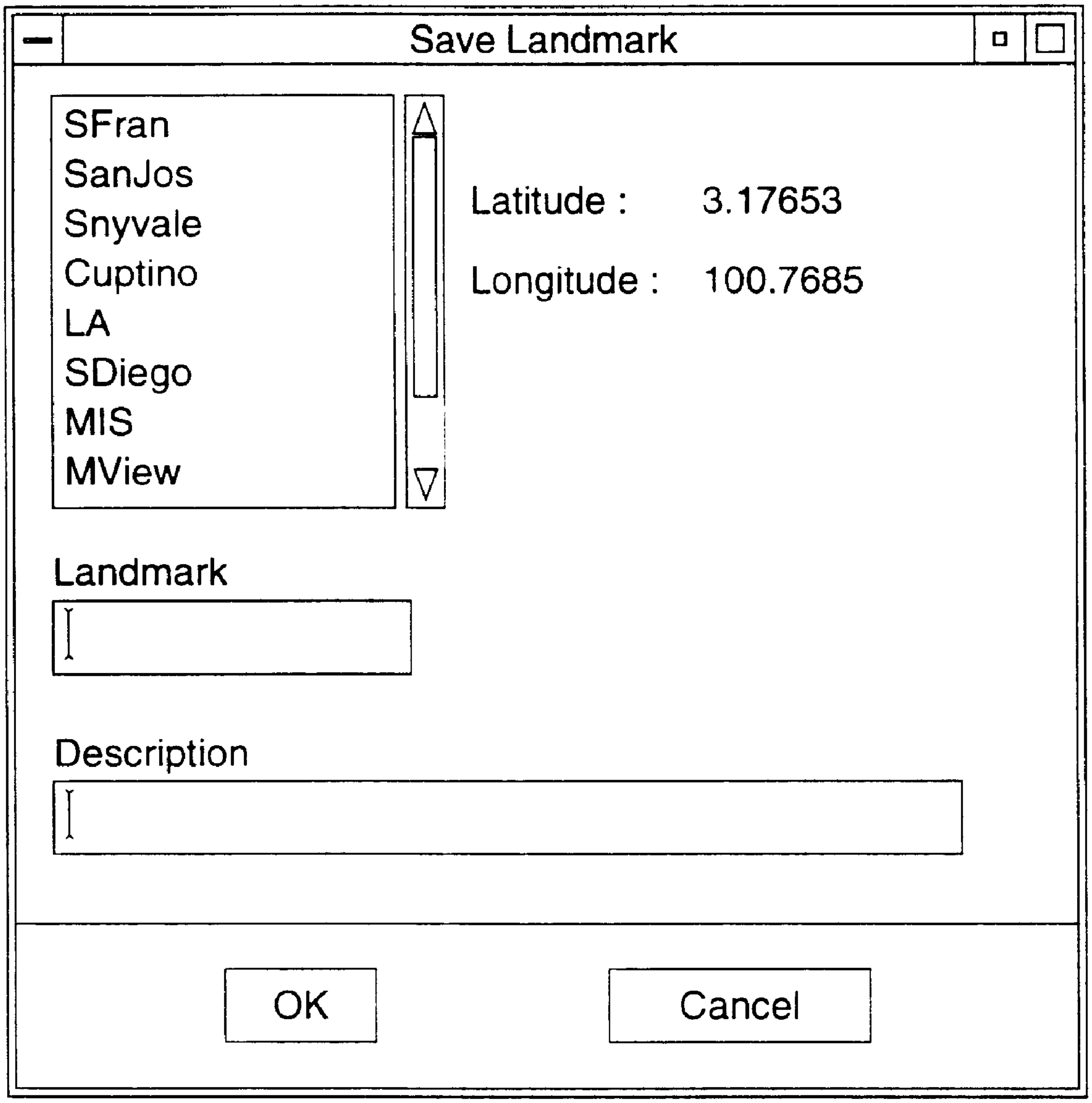

Landmarks are locations of interest to the user. This feature allows the user to designate which landmarks and alternatively, which classes of landmarks are to be displayed (or not displayed) in the map area. When the user selects the Utilities>Landmark Preferences menu option, a dialog box listing current landmarks appears. FIG. 19 illustrates the Utilities>Landmark dialog. By selecting the 'Custom' radio button in the dialog box, the user can individually select the landmarks to be shown in the map area. New landmarks can be defined by the user by using the dialog box in FIG. 20.

6.9. Analysis of Historical Reports

This feature allows the user to generate statistics pertaining to the most recently acquired historical data. Historical data is preferably acquired when the user selects the Mode>Historical data menu option as previously discussed. Once the acquisition is completed, the items under the 'Analysis' menu is activated. Upon selecting any options of the 'Analysis' menu, the mode is switched from current to historical.

Figure 21:
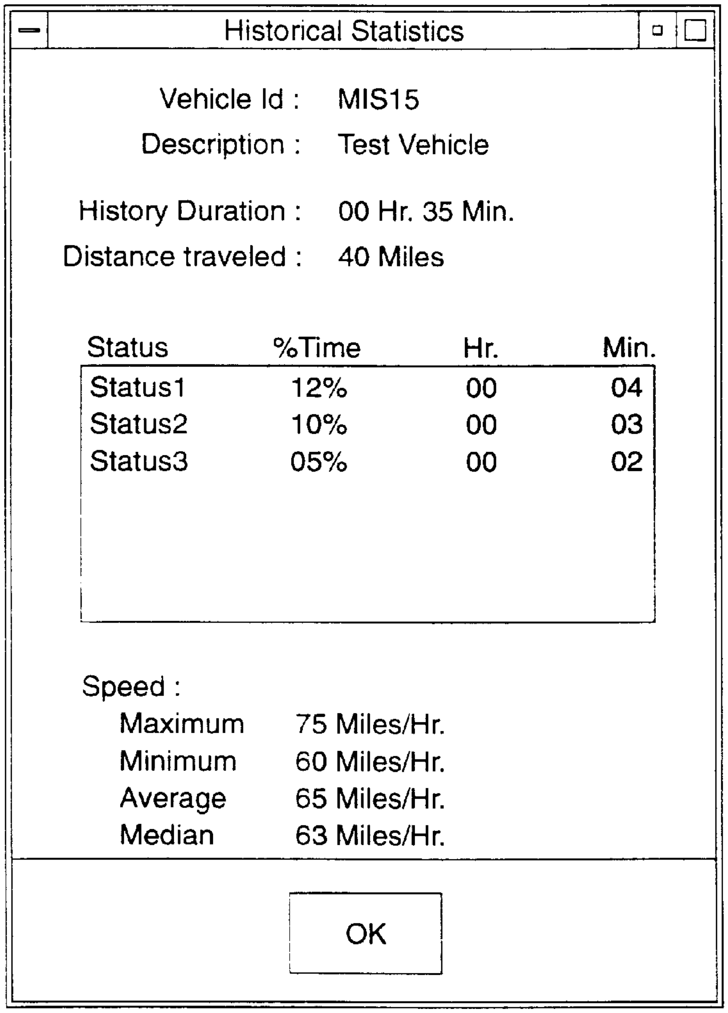
FIG. 21 illustrates the second statistics dialog box.

Analysis is facilitated by invoking the Analysis>Statistics menu option. In response a dialog box (not shown) appears. This dialog contains a list of user configurable and selectable states for which statistics can be obtained. Upon selecting the 'OK' button a second dialog box appears. FIG. 21 illustrates the second statistics dialog box. Some exemplary statistics provided are as follows: Vehicle Id; Vehicle Description; Duration—Time of statistics collection (i.e., between first and last sequence); Status (user configurable); % time—% Time spent in a state; Actual time—Actual total time spent in a state; Distance—Distance traveled in above duration; Minimum/Maximum/Average/Median speed in a period.

6.10. Vehicle Information Matrix

As previously discussed, the Vehicle Information Matrix (VIM) preferably includes data derived from a vector database. VIM window 560 preferably displayed to the user at the same time as Map Window 570 (FIG. 5). In the current mode, the VIM is preferably sorted on request, to avoid 'flashes' when the screen is updated.

Figure 22:
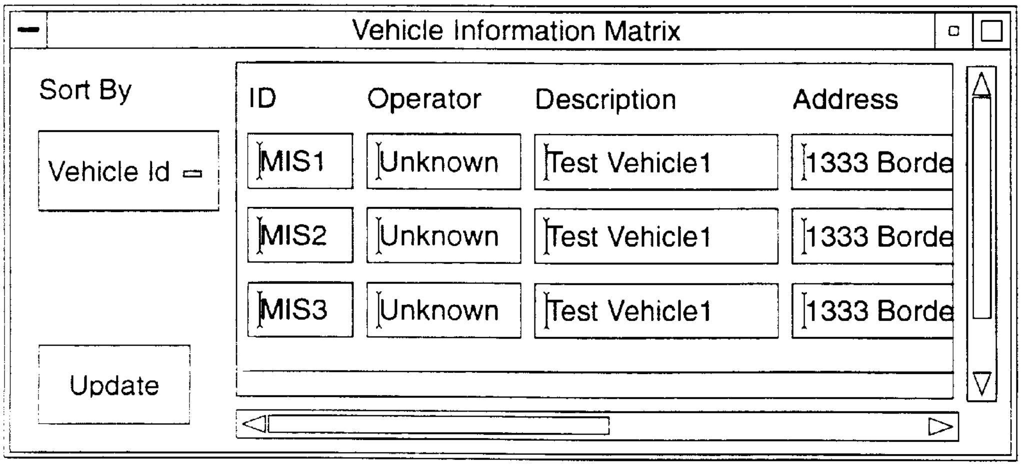
FIG. 22 illustrates a preferred embodiment of a VIM display.

FIG. 22 illustrates a preferred embodiment of a VIM display. By default the information is sorted by the sequence number in the historical mode. In current mode, however, the information is sorted when the user selects the 'Sort' menu button in the VIM display. Multiple sort options are typically available to the user, such as Vehicle ID, Job ID, Operator ID, for example from the list below.

The following information is typically displayed in the VIM: Vehicle ID; Vehicle description—Descriptive text for vehicle; Operator ID; Vehicle Status e.g., Moving/Idling/

Figure 23:
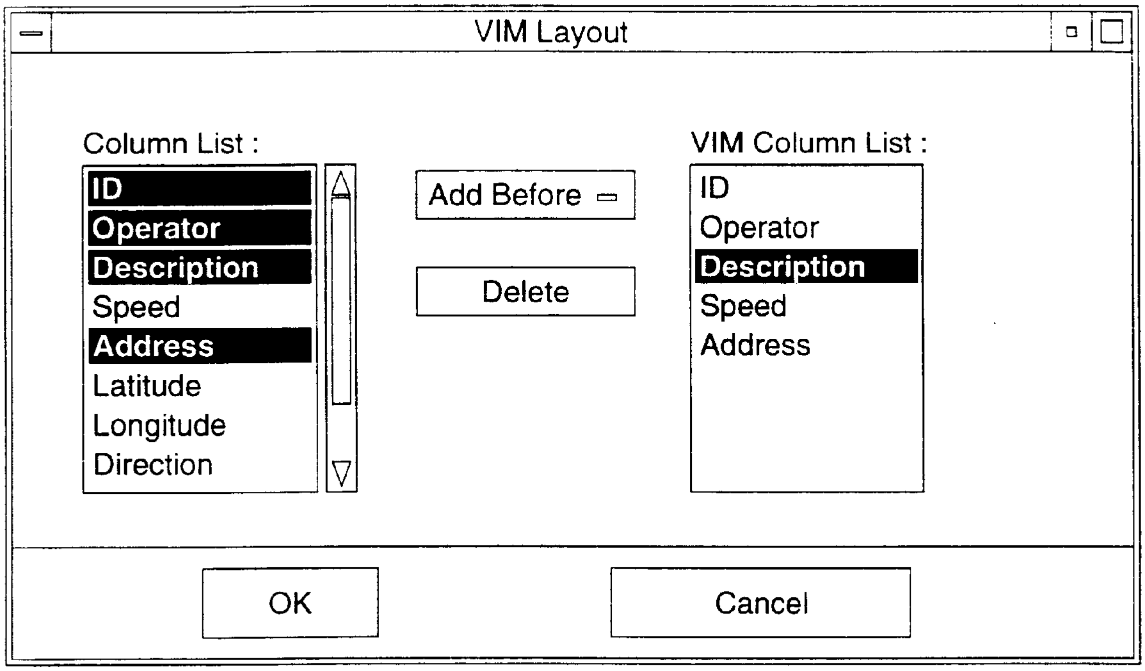
FIG. 23 illustrates that the information for a VIM is user-selectable.

Halted (up to 8 states); Operator Status e.g., Assigned, unassigned etc.; Latitude/Longitude Coordinates; Speed; Direction—Heading; Time of positioning fix, typically from a Global Positioning System (GPS) system; Current Address Street name, Intersection and City; Zone stops—List of locations and number of stops at each location; Time—Last status recorded; Distance from a chosen landmark; among other foreseeable types of information. FIG. 23 illustrates that the information for a VIM is user-selectable.

6.11. Vehicle Data Table

Figure 24:
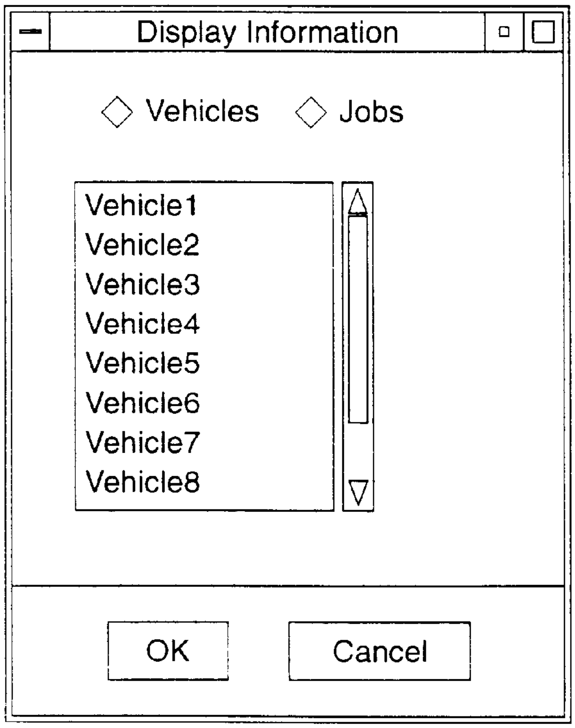
FIG. 24 illustrates a preferred embodiment of the selection dialog box.

The Vehicle Data Table (VDT) is a descriptive list of data items for a user-selected vehicle. Preferably, the VDT is retrieved when the user selects a vehicle icon with a cursor. However, if the selection takes place in a location where there are multiple vehicle icons, a list of vehicles in the vicinity of the selection is shown to the user in a dialog box. FIG. 24 illustrates a preferred embodiment of the selection dialog box. The user then selects a vehicle from this list.

Figure 25:
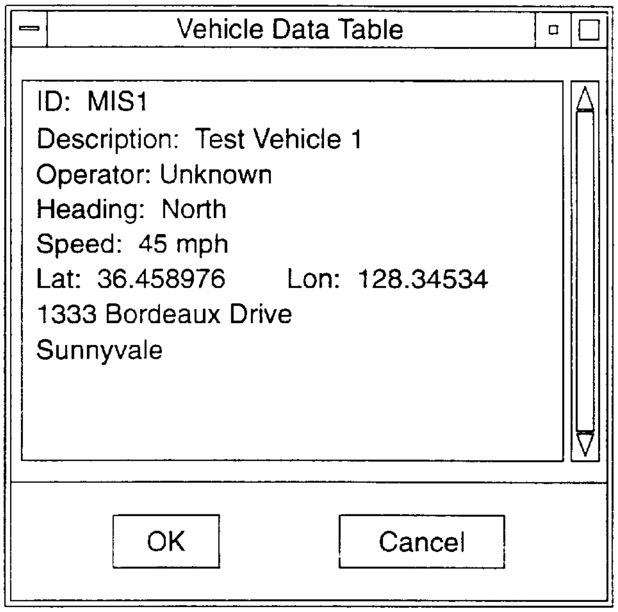
FIG. 25 illustrates an example of a VDT for a particular vehicle.

The VDT contains data, preferably similar in scope, to the Vehicle Information Matrix described above. FIG. 25 illustrates an example of a VDT for a particular vehicle.

7. Interaction with CAD

Computer Aided Dispatch (CAD) system 520 provides a framework for creating dispatching systems. This product may be viewed as an application engine which is oriented towards the fundamental requirements of dispatch such as coordinating resources in order to address demands, by organizing and communicating information. Typically CAD systems provide a basic infrastructure, tools, and functions which may be utilized in a variety of ways to address the diverse needs of specific individuals, organizations, and situations. Any available CAD system may be used in conjunction with the present system.

System 270 and CAD 520 interact via messaging. Actions are taken by the recipient based on the message type.

7.1. Displaying Job Locations on a Map

This feature allows CAD 520 to display a job on a map in System 270. Information about jobs (i.e., the message), preferably includes a map window id, a job name, a job location, job type, etc. System 270 first uses the information to determine the style, color, etc. of a job icon to draw. Then system 270 opens the requested map window and then draws the appropriate job icon. Such a map window is said to be in the 'job view' mode, described earlier. Job icons may be located in one or more locations on a map, representing multiple stopping points, for example.

7.2. Binding a CAD Job View to a Map

Job view is a combination of sorted and filtered data about jobs. System 270 system allows such job views to be displayed on maps in much the same way the Vehicle Information Matrix is displayed. System 270 allows CAD 520 to open a map window for displaying job views, that is preferably similar to a ("normal") child map window. In short, a map window is essentially opened for displaying jobs in addition to vehicles. Such a map window can be in the current mode or follow vehicle modes but not in the history mode.

System 270 currently can have a maximum of 4 open map windows, although a greater number is contemplated in alternative embodiments. Hence, System 270 can open a map only if less than 4 maps are open at the time of the request from CAD 520. If System 270 already has 4 maps open, a request from CAD 520 to open a map window will result in an (error) message being sent to CAD from System 270.

7.3. Assigning Jobs to Vehicles

System 270 allows the user to assign jobs to vehicles using a GUI interface. This can be done by dragging jobs icons from the Job View window, above, and dropping the icons onto vehicle icons on map window 380. In response, CAD system 520 identifies the drag source (the job icon and the job) and the drop destination (the vehicle icon and the vehicle).

If the drop destination is in a location where there are a cluster of vehicles icons, a list of vehicles, similar to that illustrated in FIG. 24, is presented to the user. The user can then select a vehicle from that list. To facilitate the above functionality, System 270 and CAD will exchange the relevant information via messages.

7.4. Displaying Job Information

This functionality allows the user to double click on a job icon and display information about a particular job in a dialog box in much the same way a vehicle data table is displayed (FIG. 25). FIG. 26 illustrates a preferred embodiment of the Job information table. The information about the job is obtained by System 270 from CAD system 520 using services provided by CAD system 520.

It the double click takes place in a cluster of vehicle and job icons. If a vehicle or job cannot be identified uniquely, a list of jobs, similar to that illustrated in FIG. 24, is presented to the user. The user can then select a job from that list. To facilitate the above functionality, System 270 and CAD will exchange the relevant information via messages.

System 270 currently provides this service for displaying the job information without interpreting or formatting the data, although preferably maintains this information within Job File 460.

7.5. Gathering Data for VDT

The Vehicle Data Table contains additional fields relating to the jobs assigned to a vehicle. When the VDT is popped up, information about the job is obtained from CAD 520.

System 270 currently provides this service for displaying the job information without interpreting or formatting the data, although preferably maintains this information within Job File 460.

7.6. Geocoding for CAD

Geocoding functions are preferably performed by an external Geocoding system 510. In alternative embodiments, geocoding functionality may be integrated into System 270.

7.7. Job Icon Shapes and Colors

System 270 typically determines the shape, size, color, etc. of job icons and their definition with regard to job status, etc. in response to the user's preferences. CAD system 520 typically only provides the lists of the jobs and status. System 270 will use this information to display job icons in various shapes and colors.

7.8. Vehicle Icon

System 270 typically determines the shape, size, color, etc. of vehicle icons and their definition with regard to jobs and operators, etc. in response to the user's preferences. CAD system 520 typically only provides the lists of the vehicles, jobs and operators assigned thereto, and status. System 270 will use this information to display job icons in various shapes and colors.

7.9. Initialization/Exit

System 270 informs CAD system 520 when System 270 is initialized. Once initialized CAD system 520 connects to System 270 and then sends System 270 information about jobs via messages. System 270 uses this information to display job icons on the map window(s) or open a map window in job view mode. If CAD system 520 exits while System 270 is still running, CAD system 520 send a message to System 270 just before exiting. At this time any map window which is in the job view mode will be forcibly closed. If the user quits the map window which is in the job view mode, System 270 sends a message to CAD system 530. At this point CAD can take appropriate action.

7.10. Messages from CAD systems to System 270

The preferred embodiment of the present invention handles the following messages from CAD systems 520, other message handlers are also contemplated in alternative embodiments of the present invention:

Open Map (Msg Id 501)—This message is sent by CAD system 520 requesting system 270 to open a separate map Window 380 for displaying job icons only. Upon receiving this message system 270 opens a map window in a job view mode. The ID of the newly created map window will be returned to CAD system 520. CAD system 520 can then use this window ID to display job sets in this window.

Close Map (Msg Id 502)—This message is sent by CAD systems 520 to close the map window opened via the Open Map request.

Get Job Queue Size (Msg Id 503)—The information about the jobs is maintained in a circular queue. The maximum number of job icons that can be displayed is limited by the current size of the queue. CAD systems 520 queries the size of circular queue using this message.

Set Job Queue Size (Msg Id 504)—CAD systems 520 send this message to alter the size of the queue holding job information. System 520 typically imposes an upper limit on the size of the queue.

Display Job Set (Msg Id 507)—CAD systems 520 send this message to display the list of jobs in the given job set. The message packet sent by CAD system 520 contains the ID of the map window to which the job icons are to be displayed. However, an ID of ALLWINDOWS(predefined constant) may be used to draw the job icons in all map windows 380. If a new map window is opened after this message is received existing job icons will be drawn in the newly opened window too.

Assign Jobs to Vehicle (Msg Id 508)—This message is used by CAD systems 520 to assign a number of jobs to a vehicle operator. Upon receiving this message System 270 updates the operator icon to display the number of jobs assigned to that operator.

Operator Status (Msg Id 510)—This message is used by CAD systems 520 to assign a operator to a vehicle or to notify System 270 about the change in operator status.

Job Information (Msg Id 505)—This message is sent by CAD system 520 in response to Request Job Info message (Msg Id 604). This packet contains the pre-formatted data about the job for which System 270 has requested information.

Assigned Job Information (Msg Id 506)—This message is sent by CAD systems 520 in response to Request Assigned Job Info message(Msg Id 605). This message contains information about the jobs assigned to the given vehicle. System 270 imposes no restriction on the format of the returned information. The data buffer containing the information is preferably displayed as is.

7.11. Messages from System 270 to CAD systems 520

The preferred embodiment of the present invention handles the following messages to CAD systems 520, other message handlers are also contemplated in alternative embodiments of the present invention:

Open Map Response (Msg Id 601)—System 270 sends this message in response to the Open Map (Msg Id 501) request. If a new map can be opened successfully this message contains the ID of the open map window else it contains an error code describing the reason for error.

JobQueueSize (Msg Id 602)—This message is sent in response to the Get Job Queue Size (Msg Id 503) request from CAD systems 520. It contains the current size of the job queue indicating the maximum number of jobs icons that can be displayed on a map.

Map Destroyed (Msg Id 603)—This message is sent by System 270 to notify that the map window opened by CAD system 520 has been closed upon the end user request.

Request Job Info (Msg Id 604)—This message is sent by System 270 to request additional information about a Job. This request is generated when the user wants to display detailed information about a job.

Request Assigned Job Info (Msg Id 605)—This message is sent by System 270 requesting information about the jobs assigned to a vehicle operator. This request is generated when the end user requests the VDT to be displayed.

Exit Message (Msg Id 606)—This message is sent by System 270 just before quitting. This message is generated when the end user chooses to quit System 270.

Conclusion

In the foregoing specification, the invention has been described with reference to specific exemplary embodiments thereof. Many changes or modifications are readily envisioned. For example, it is envisioned that fleet vehicles can be equipped with embodiments of the present invention, thus enabling drivers to graphically determine their geographic position, their present street address, the job status, etc. Also, many types of positioning systems, geocoder systems, and CAD systems could be easily modified to interface to the preferred embodiments of the present invention. Further, it is foreseeable that vector map technology will one day improve so as to be equivalent to current raster maps, i.e. including geographic data. Thus, raster map databases may not be needed in alternative embodiments of the present invention. Any sort of imaginable icon shapes, colors, sizes, sounds, or other attributes can be used in alternative embodiments of the present invention, and are within the scope of the present invention.

The presently claimed invention may also be applied to other areas of fleet management than courier services described above. For example, an embodiment of the claimed invention may be used in a golf course environment with transmitters installed in each golf cart. A fleet manager at the club house is then able to graphically track the progress of golfers on the course, zoom-in on selected portions (holes) of the golf course to determine where there are back-ups or slow players, etc. Further, if embodiments of the present invention are installed on individual golf carts, the users are able to graphically determine their position on the course, or on a hole. The users thus are able to see the geographic layout of a hole, including trees, bunkers, rough, etc., and can determine the distance from their cart to user-selected locations on the screen (proximity function). For example, distance to the rear-edge of a bunker, to the front edge of a ravine, to the pin, etc. Since pin placement on a green typically varies each day, the maps can be updated daily, and the users can be given up-to-date layouts of the course.

In another example, an embodiment of the claimed invention may be used by schools or parents, with pager-sized transmitters carried by their children. A Parent could then be able to graphically track her children within the neighborhood. Further, the parent could quickly determine the street address of her children and pick them up, if they are lost.

Although the above description fully describes a preferred embodiment of the present invention, implementation specific details and data structures are described in the attached Detailed Design and Functional Specification in Appendix A (not printed here but available in file wrapper). Further integration of the preferred embodiment with any available positioning systems, geocoder systems, and CAD systems is also described in Appendix A.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed:

1. A method for tracking a location of a transmitter with a computer system, the computer system coupled to a vector database, the method comprising:

determining the location of the transmitter;

displaying a rasterized representation of a geographic area on a display, in response to the location of the transmitter;

determining an icon from a plurality of icons, associated with the transmitter;

displaying the icon on the rasterized representation on the display, in response to the location of the transmitter; and outputting vector data in response to the location of the transmitter, wherein the transmitter is associated with a particular job; and the icon has a size on the display associated with a size of the particular job.

2. The method of claim 1 wherein the transmitter is associated with a vehicle from a plurality of vehicles; and wherein the icon is associated with the vehicle.

3. The method of claim 2 wherein the rasterized representation of the geographic area is derived from a vector map database.

4. The method of claim 1 wherein the transmitter is associated with a vehicle from a plurality of vehicles; and wherein the icon has a color associated with the vehicle.

5. The method of claim 4 wherein the color of the icon indicates whether the vehicle is suitable for a particular job.

6. The method of claim 1 wherein the transmitter is associated with a vehicle from a plurality of vehicles; and wherein the icon has a shape associated with the vehicle.

7. The method of claim 1 wherein the transmitter is associated with a job type from a plurality of jobs; and wherein the icon is associated with the job.

8. The method of claim 1 wherein the transmitter is associated with a job from a plurality of jobs; and wherein the icon has a color associated with the job.

9. The method of claim 1 wherein the transmitter is associated with an operator from a plurality of operators; and wherein the icon is associated with the operator.

10. A method for tracking a location of a transmitter with a computer system, the computer system coupled to a vector database, the method comprising:

determining the location of the transmitter;

displaying a rasterized representation of a geographic area on a display, in response to the location of the transmitter;

determining an icon from a plurality of icons, associated with the transmitter;

displaying the icon on the rasterized representation on the display, in response to the location of the transmitter;

outputting vector data in response to the location of the transmitter;

determining a particular job associated with the transmitter;

determining a landmark for the particular job; and displaying a landmark icon on the rasterized representation on the display.

11. The method of claim 10 wherein the transmitter is associated with a vehicle from a plurality of vehicles; and wherein the icon is associated with the vehicle.

12. The method of claim 11 wherein the rasterized representation of the geographic area is derived from a raster map database.

13. The method of claim 11 wherein the rasterized representation of the geographic area is derived from a vector map database.

14. The method of claim 10 wherein the transmitter is associated with a vehicle from a plurality of vehicles; and wherein the icon has a color associated with the vehicle.

15. The method of claim 14 wherein the color of the icon indicates whether the vehicle is suitable for a particular job.

16. The method of claim 10 wherein the transmitter is associated with a vehicle from a plurality of vehicles; and wherein the icon has a shape associated with the vehicle.

17. The method of claim 10 wherein the transmitter is associated with a job type from a plurality of jobs; and wherein the icon is associated with the job.

18. The method of claim 10 wherein the transmitter is associated with a job from a plurality of jobs; and wherein the icon has a color associated with the job.

19. The method of claim 10 wherein the transmitter is associated with a particular job; and wherein the icon has a size on the display associated with a size of the particular job.

20. The method of claim 10 wherein the transmitter is associated with an operator from a plurality of operators; and wherein the icon is associated with the operator.

21. A method for tracking a location of a transmitter with a computer system, the computer system coupled to a vector database, the method comprising:

determining the location of the transmitter;

displaying a rasterized representation of a geographic area on a display, in response to the location of the transmitter;

determining an icon from a plurality of icons, associated with the transmitter;

displaying the icon on the rasterized representation on the display, in response to the location of the transmitter; and outputting vector data in response to the location of the transmitter, wherein the rasterized representation of the geographic area is derived from a raster map database, the transmitter is associated with a vehicle from a plurality of vehicles, and the icon is associated with the vehicle.

22. The method of claim 21 wherein the transmitter is associated with a vehicle from a plurality of vehicles; and wherein the icon has a color associated with the vehicle.

23. The method of claim 21 wherein the color of the icon indicates whether the vehicle is suitable for a particular job.

24. The method of claim 21 wherein the transmitter is associated with a vehicle from a plurality of vehicles; and wherein the icon has a shape associated with the vehicle.

25. The method of claim 21 wherein the transmitter is associated with a job type from a plurality of jobs; and wherein the icon is associated with the job.

26. The method of claim 21 wherein the transmitter is associated with a job from a plurality of jobs; and wherein the icon has a color associated with the job.

27. The method of claim 21 wherein the transmitter is associated with a particular job; and wherein the icon has a size on the display associated with a size of the particular job.

28. The method of claim 21 wherein the transmitter is associated with an operator from a plurality of operators; and wherein the icon is associated with the operator.

29. The method of claim 21 further comprising the steps of:

determining a particular job associated with the transmitter;

determining a landmark for the particular job; and displaying a landmark icon on the rasterized representation on the display.

30. The method of claim 21 wherein the rasterized representation of the geographic area is derived from a vector map database.

31. A method for tracking locations of transmitters with a computer system, the computer system coupled to a vector map database, the method comprising:

determining a location of a first transmitter and a second transmitter;

displaying a first rasterized representation of a first geographic area on a display, in response to the location of the first transmitter;

displaying a second rasterized representation of a second geographic area on the display, in response to the location of the second transmitter;

determining a first icon from a plurality of icons, associated with the first transmitter;

determining a second icon from the plurality of icons, associated with the second transmitter;

displaying the first icon on the first rasterized representation on the display, in response to the location of the first transmitter;

displaying the second icon on the second rasterized representation on the display, in response to the location of the second transmitter; and outputting vector data in response to the location of the first transmitter and the second transmitter, wherein the first rasterized representation of the first geographic area is derived from a raster map database and the second rasterized representation of the second geographic area is derived from the vector map database.

32. The method of claim 31 wherein the act of determining a location of the first transmitter comprises receiving data from a global positioning sensing device.

33. A method for tracking a location of a vehicle with a computer system, the computer system coupled to a vector database, the method comprising:

displaying a rasterized representation of a geographic area on a display, in response to the location of the vehicle;

displaying an icon from a plurality of icons, associated with the vehicle on the rasterized representation of the geographic area on the display, in response to the location of the transmitter;

displaying a rasterized representation of a portion of the geographic area on the display;

outputting vector data from the vector database in response to the location of the vehicle; and selecting the portion of the geographic area, wherein the rasterized representation of the geographic area is derived from a raster database.

34. The method of claim 33 wherein the selecting comprises determining the portion of the geographical area using a positioning device.

35. The method of claim 33 wherein the rasterized representation of the portion of the geographic area is derived from a vector map database.

36. A method for tracking a location of a vehicle with a computer system, the computer system coupled to a vector database, the method comprising:

displaying a rasterized representation of a geographic area on a display, in response to the location of the vehicle;

displaying an icon from a plurality of icons, associated with the vehicle on the rasterized representation of the geographic area on the display, in response to the location of the transmitter;

displaying a rasterized representation of a portion of the geographic area on the display; and outputting vector data from the vector database in response to the location of the vehicle, wherein the rasterized representation of the geographic area is derived from a raster database and the rasterized representation of the portion of the geographic area is derived from a raster database.

37. The method of claim 36 further comprising selecting the portion of the geographic area.

38. The method of claim 37 wherein the selecting comprises determining the portion of the geographical area using a positioning device.

39. The method of claim 37 wherein the rasterized representation of the portion of the geographic area is derived from a vector map database.

40. The method of claim 37 wherein the rasterized representation of the geographic area is derived from a raster database.

41. A method for graphically assigning jobs to vehicles with a computer system coupled to a vector database and a dispatching system, the method comprising:

determining a location of a vehicle;

displaying a rasterized representation of a geographic area on a display;

determining a vehicle icon from a plurality of vehicle icons, the vehicle icon associated with the vehicle;

outputting vector data from the vector database in response to the location of the vehicle;

displaying the vehicle icon on the rasterized representation on the display, in response to the location of the vehicle;

displaying a job icon on the display representing a job, in response to data from the dispatching system; and assigning the job to the vehicle by moving the job icon on top of the vehicle on the display.

42. The method of claim 41, further comprising updating the dispatching system in response to the assigning step.

43. The method of claim 41, further comprising displaying a plurality of job icons on the display representing a plurality of jobs.

44. A computer program product comprising:

a computer-readable media including:

code that receives a location of a vehicle;

code that directs an output of a rasterized representation of a geographic area on a display;

code that determines a vehicle icon from a plurality of different vehicle icons, associated with the vehicle;

code that outputs vector data from the vector database in response to the location of the vehicle;

code that directs an output of the vehicle icon on the rasterized representation on the display, in response to the location of the vehicle;

code that directs an output of a job icon on the display representing a job, in response to data from the dispatching system; and code that assigns the job to the vehicle in response to the job icon being moved on top of the vehicle on the display.

* * * * *